US012627947B2

(12) United States Patent
Geltz

(10) Patent No.: US 12,627,947 B2
(45) Date of Patent: May 12, 2026

(54) APPARATUSES, COMPUTER-IMPLEMENTED METHODS, AND COMPUTER PROGRAM PRODUCTS FOR IMPROVED DATA TRANSMISSION AND TRACKING

(71) Applicant: Andrew Lyle Geltz, Gainesville, GA (US)

(72) Inventor: Andrew Lyle Geltz, Gainesville, GA (US)

(73) Assignee: Andrew Lyle Geltz, Gainesville, GA (US)

( * ) Notice: Subject to any disclaimer, the term of this patent is extended or adjusted under 35 U.S.C. 154(b) by 209 days.

(21) Appl. No.: 18/468,301

(22) Filed: Sep. 15, 2023

(65) Prior Publication Data

US 2024/0007829 A1     Jan. 4, 2024

Related U.S. Application Data

(63) Continuation of application No. 17/451,261, filed on Oct. 18, 2021, now Pat. No. 11,800,324.

(Continued)

(51) Int. Cl.
*G06F 3/14*       (2006.01)
*H04W 4/029*     (2018.01)

(52) U.S. Cl.
CPC .............. *H04W 4/029* (2018.02); *G06F 3/14* (2013.01)

(58) Field of Classification Search
CPC ................................. H04W 4/029; G06F 3/14

(Continued)

(56) References Cited

U.S. PATENT DOCUMENTS 6,788,653 B1 * 9/2004 Sakamoto ......... H04L 12/40058
                                          370/282
8,989,961 B2 3/2015 Chien
           (Continued)

FOREIGN PATENT DOCUMENTS

EP           2339767 A1     6/2011

OTHER PUBLICATIONS

U.S. Appl. No. 17/451,261, filed Oct. 18, 2021, U.S. Pat. No. 11,800,324, Issued.

(Continued)

*Primary Examiner* — Thomas J Lett
(74) *Attorney, Agent, or Firm* — ALSTON & BIRD LLP

(57) ABSTRACT

Embodiments of the present disclosure provide for improved data transmission and tracking of data transmitted utilizing wireless networks. Wirelessly transmitted enhanced signal waves, such as enhanced radio signal waves, are commonly transmitted within a particular defined or target geographic area. Data associated with particular content embodied by particular enhanced signal waves may be transmitted and received by a specially configured signal processor, such that the specially configured signal processor may extract such additional data and cause outputting of such additional data via a separate, connected device. In the example context of radio transmissions, embodiments provide for receiving an enhanced radio transmission signal including radio transmission content and enhanced external display data, such embodiments extracting the enhanced external display data and forwarding the enhanced external display data to a deliverables connected client device to cause rendering, via the deliverables connected client device, of a deliverables display interface based at least in part on the enhanced external display data.

20 Claims, 13 Drawing Sheets

Related U.S. Application Data

(60) Provisional application No. 63/133,032, filed on Dec. 31, 2020.

(58) Field of Classification Search
USPC ...................................................... 455/456.1
See application file for complete search history.

(56) References Cited

U.S. PATENT DOCUMENTS

| | | | | |
|---|---|---|---|---|
| 9,768,853 | B1 * | 9/2017 | Kroeger | ................ H04H 40/18 |
| 9,917,605 | B2 | 3/2018 | Wang | |
| 10,079,871 | B2 | 9/2018 | Lewis | |
| 10,159,098 | B2 | 12/2018 | O'Meara | |
| 10,991,009 | B2 | 4/2021 | Marsh | |
| 11,082,723 | B2 | 8/2021 | LaJoie | |
| 11,122,316 | B2 | 9/2021 | Tidwell | |
| 11,403,849 | B2 | 8/2022 | Weerasinghe | |
| 2007/0113243 | A1 | 5/2007 | Brey | |
| 2010/0166042 | A1 * | 7/2010 | Iannuzzelli | ........... H04H 20/67 |
| | | | | 375/145 |
| 2010/0291861 | A1 | 11/2010 | Anzures | |
| 2015/0193516 | A1 | 7/2015 | Harb | |
| 2016/0094893 | A1 | 3/2016 | Tse | |
| 2018/0294906 | A1 * | 10/2018 | Carlock | ................ G06F 16/639 |

OTHER PUBLICATIONS

International Search Report and Written Opinion for International Application No. PCT/US2021/073135, dated Mar. 17, 2022, (9 pages), United States Patent and Trademark Office, USA.

* cited by examiner

START/
BLOCK 908 —— 1100

Receiving access data indicative of access, via
the deliverables connected client device, of the deliverable display interface
associated with the enhanced external display data —— 1102

Storing at least a portion of the access data associated
with the enhanced external display data —— 1104

END

1

APPARATUSES, COMPUTER-IMPLEMENTED METHODS, AND COMPUTER PROGRAM PRODUCTS FOR IMPROVED DATA TRANSMISSION AND TRACKING

CROSS-REFERENCE TO RELATED APPLICATIONS

This application is a continuation of and claims priority to U.S. application Ser. No. 17/451,261, titled "APPARATUSES, COMPUTER-IMPLEMENTED METHODS, AND COMPUTER PROGRAM PRODUCTS FOR IMPROVED DATA TRANSMISSION AND TRACKING" filed Oct. 18, 2021, which claims priority to U.S. Provisional App. No. 63/133,032 filed Dec. 31, 2020, the contents of each of which are incorporated by reference herein in their entireties.

TECHNOLOGICAL FIELD

Embodiments of the present disclosure generally relate to transmission, processing, and tracking of wirelessly transmitted signals, and specifically to enabling outputting, via deliverables connected client device(s), of enhanced external display data associated with content of wirelessly transmitted enhanced signal waves, and tracking of access, interaction, and/or other engagement with such enhanced external display data.

BACKGROUND

Enhanced signal waves wirelessly transmitted for output to one or more users often are transmitted without any ability to know what users and/or devices received the enhanced signal waves. Additionally or alternatively, for example, the enhanced signal waves may correspond to additional content that conventionally is incapable of being output by receiving device(s). For example, in the context of enhanced radio signal wave transmissions, conventionally such enhanced radio signal waves are transmitted that contain basic audio content (e.g., songs, advertisements, and/or voice data to be output by speakers of a recipient radio) and/or basic "now playing" information associated with the basic audio content (e.g., artist information, song title information, and/or the like). Applicant has discovered problems with current implementations for transmitting and tracking of wirelessly transmitted signals. Through applied effort, ingenuity, and innovation, Applicant has solved many of these identified problems by developing embodiments of the present disclosure, which are described in detail below.

BRIEF SUMMARY

In general, embodiments of the present disclosure provided herein provide improved wireless data transmission and tracking. Other implementations for providing improved wireless data transmission and tracking will be, or will become, apparent to one with skill in the art upon examination of the following figures and detailed description. It is intended that all such additional implementations be included within this description be within the scope of the disclosure, and be protected by the following claims.

In accordance with a first aspect of the present disclosure, a computer-implemented method is provided. The computer-implemented method provides for improved data transmission and tracking. The computer-implemented method is executable via any number of computing device(s) embodied in hardware, software, firmware, and/or a combination thereof. In some example embodiments of the computer-implemented method, the computer-implemented method includes receiving, by an enhanced delivering radio processor via a radio receiver, an enhanced radio transmission signal, the enhanced radio transmission signal comprising at least radio transmission content and enhanced external display data. The example computer-implemented method further includes extracting, by the enhanced delivering radio processor, the enhanced external display data from the enhanced radio transmission signal, where the enhanced external display data is associated with an electronic deliverable. The example computer-implemented method further includes forwarding the enhanced external display data from the enhanced delivering radio processor to a deliverables connected client device communicable with the enhanced delivering radio processor. The example computer-implemented method further includes causing rendering, via the deliverables connected client device, of a deliverables display interface based at least in part on the enhanced external display data.

Additionally or alternatively, in some example embodiments of the example computer-implemented method, the enhanced delivering radio processor and the deliverables connected client device are communicable using a client device connectivity application.

Additionally or alternatively, in some example embodiments of the example computer-implemented method, the enhanced delivering radio processor is connected to the deliverables connected client device via a wired connection.

Additionally or alternatively, in some example embodiments of the example computer-implemented method, the enhanced delivering radio processor is connected to the deliverables connected client device via a close-range wireless connection.

Additionally or alternatively, in some example embodiments of the example computer-implemented method, the enhanced delivering radio processor comprises a vehicle head system communicatively coupled with the radio receiver.

Additionally or alternatively, in some example embodiments of the example computer-implemented method, the enhanced external display data comprises a redeemable deliverable code associated with the electronic deliverable.

Additionally or alternatively, in some example embodiments of the example computer-implemented method, the enhanced external display data comprises a web resource locator associated with the electronic deliverable.

Additionally or alternatively, in some example embodiments of the example computer-implemented method, the enhanced external display data comprises display data that represents at least a portion of the deliverables display interface.

Additionally or alternatively, in some example embodiments of the example computer-implemented method, the example computer-implemented method further includes receiving a location data object associated with the deliverables connected client device in response to access of the deliverables display interface associated with the enhanced external display data; and validating the location data object associated with the deliverables connected client device based at least in part on a target location geofence associated with the enhanced external display data.

Additionally or alternatively, in some example embodiments of the example computer-implemented method, the example computer-implemented method further includes receiving access data indicative of access, via the deliverables connected client device, of the deliverables display interface associated with the enhanced external display data; and storing at least a portion of the access data associated with the enhanced external display data.

Additionally or alternatively, in some example embodiments of the example computer-implemented method, the enhanced external display data is correlated with the radio transmission content.

Additionally or alternatively, in some example embodiments of the example computer-implemented method, the example computer-implemented method further includes receiving connection approval indicator enabling communication between the enhanced delivering radio processor and the deliverables connected client device, where the enhanced delivering radio processor forwards the enhanced external display data upon receipt of the connection approval indicator.

Additionally or alternatively, in some example embodiments of the example computer-implemented method, the radio transmission content is received over a first transmission channel, and the enhanced external display data is received over a second transmission channel.

Additionally or alternatively, in some example embodiments of the example computer-implemented method, the enhanced radio transmission signal is generated based at least in part on the radio data system protocol.

In accordance with a second aspect of the present disclosure, an apparatus is provided. The apparatus provides for improved data transmission and tracking. An example apparatus includes at least one processor and at least one memory having computer-coded instructions stored thereon, where the computer-coded instructions in execution with the at least one processor causes the apparatus to perform any one of the example computer-implemented methods described herein. Another example apparatus includes means for performing each step of any one of the computer-implemented methods described herein.

In accordance with a third aspect of the present disclosure, a computer program product is provided. The computer program product provides for improved data transmission and tracking. An example computer program product includes at least one non-transitory computer-readable storage medium having computer program code stored thereon that, in execution with at least one processor, configures the computer program product for performing any one of the computer-implemented methods described herein.

BRIEF DESCRIPTION OF THE DRAWINGS

Figure 1:
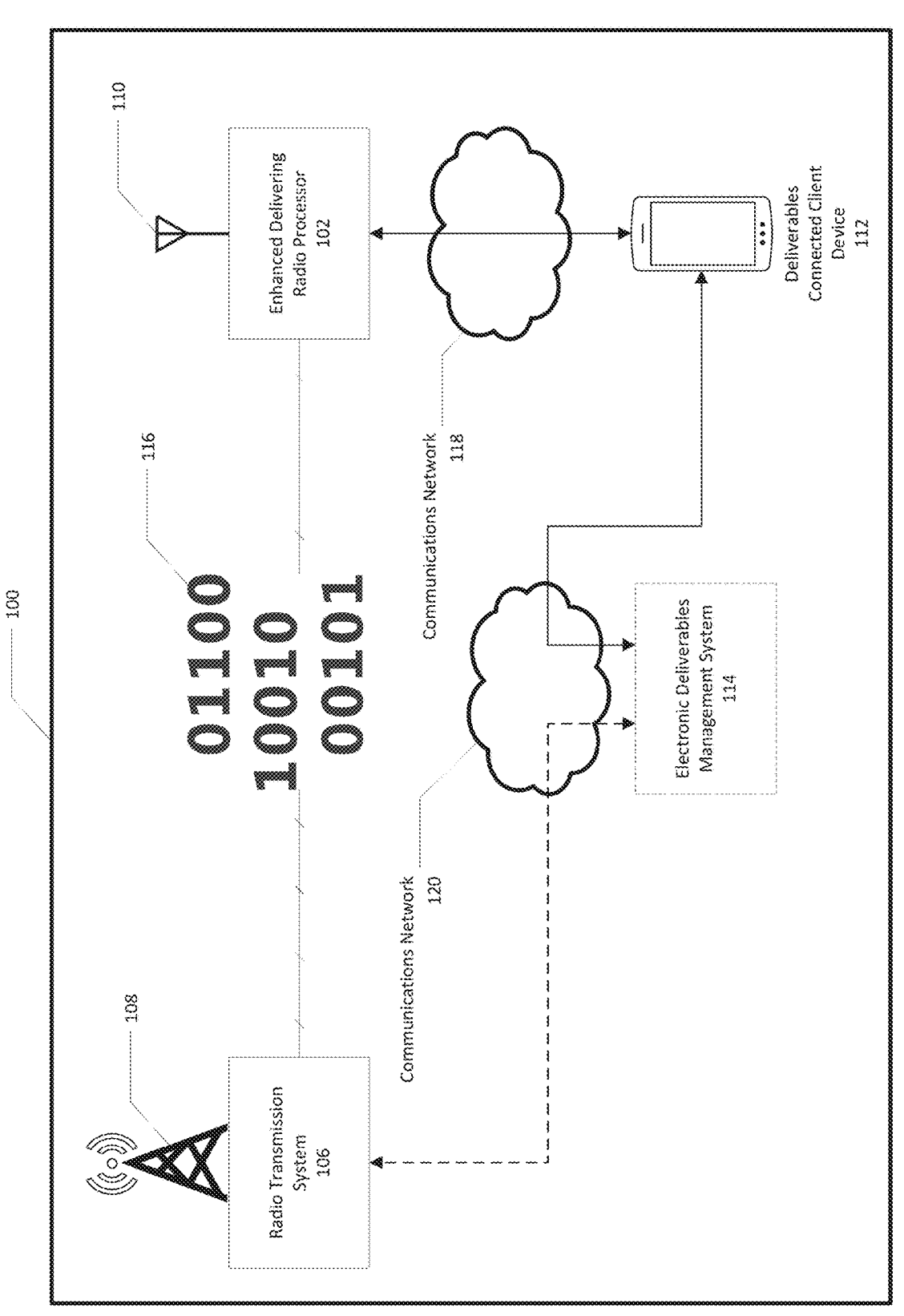
Figure 2:
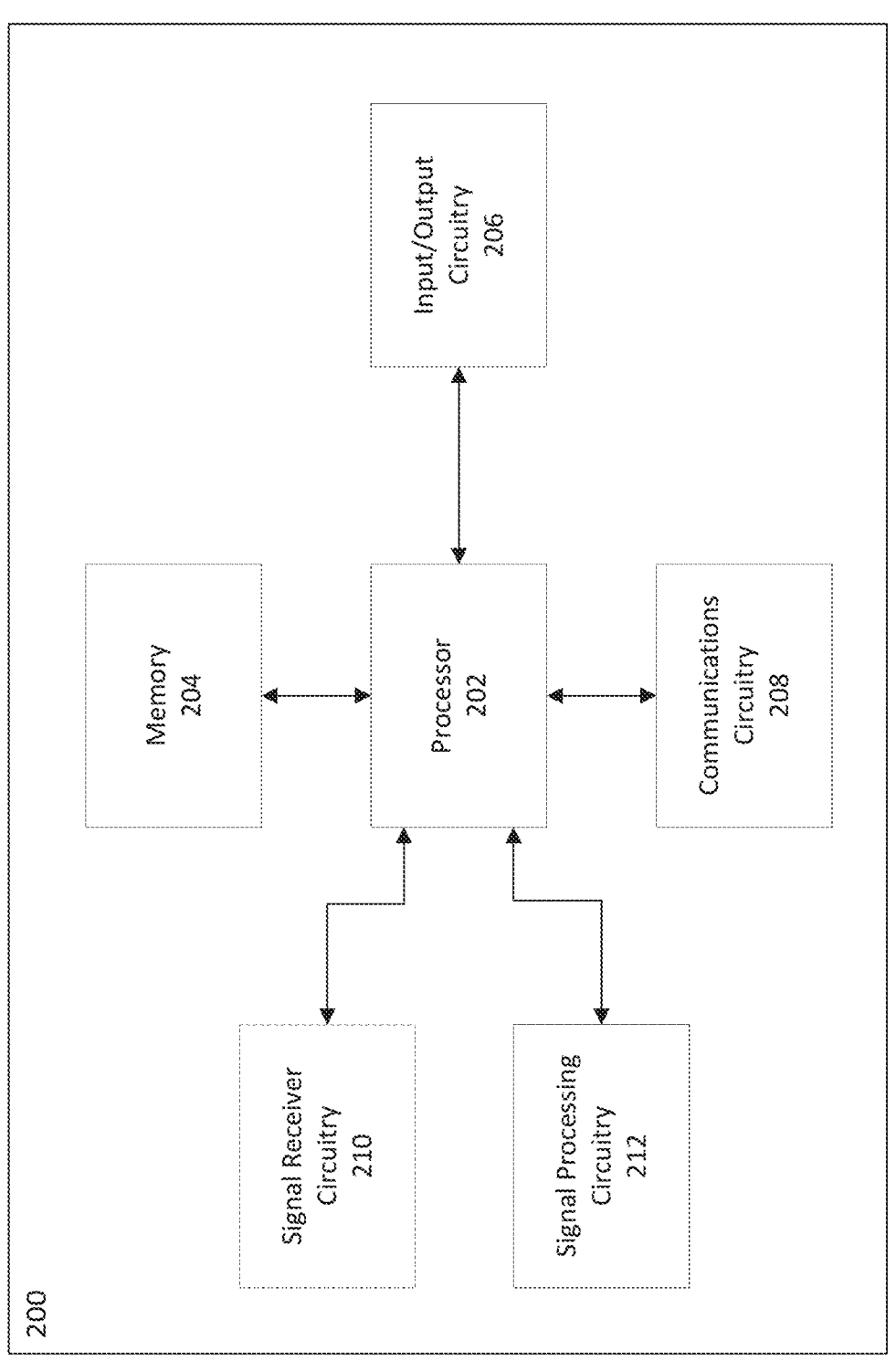
Figure 3:
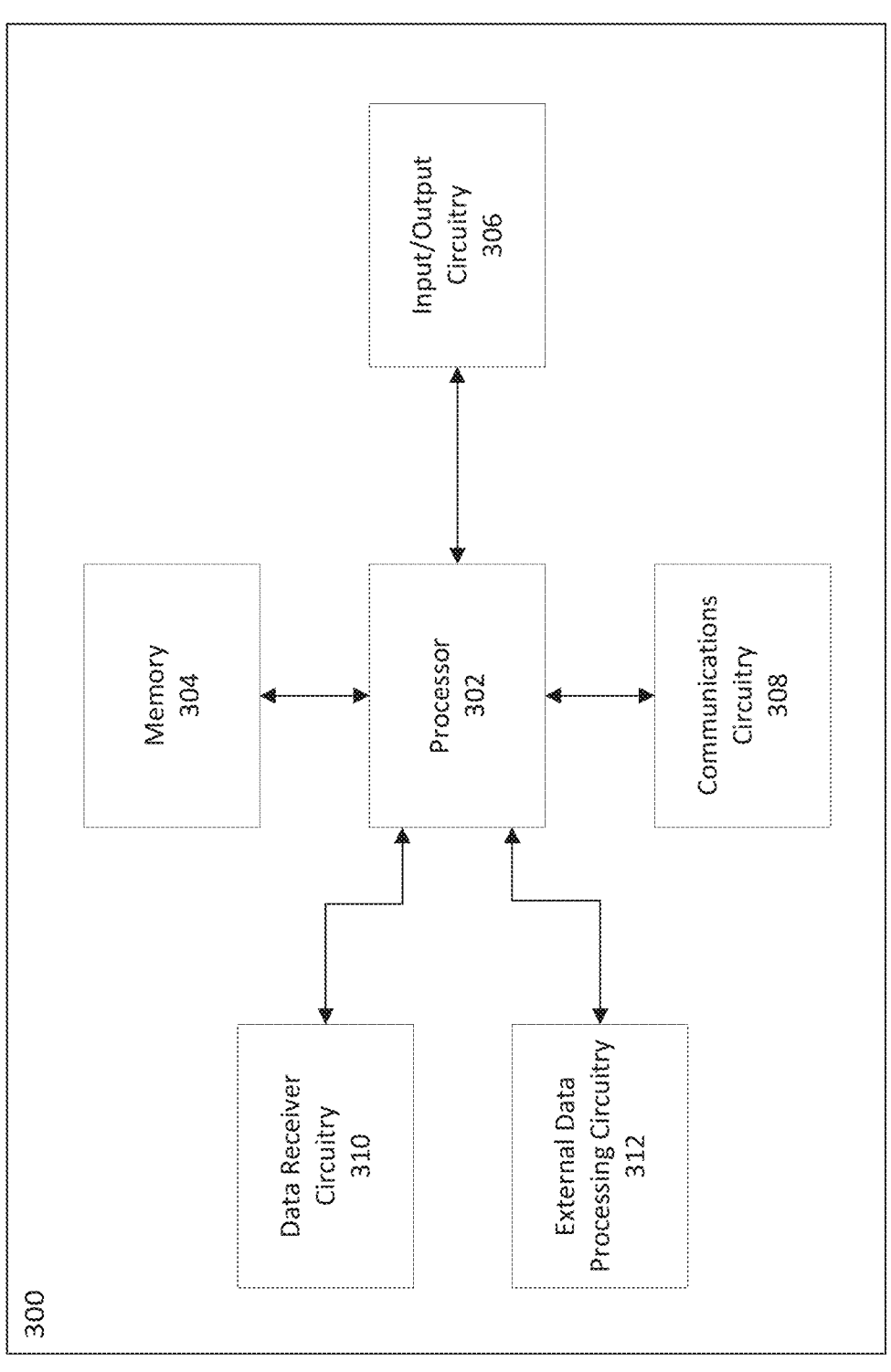
Figure 4:
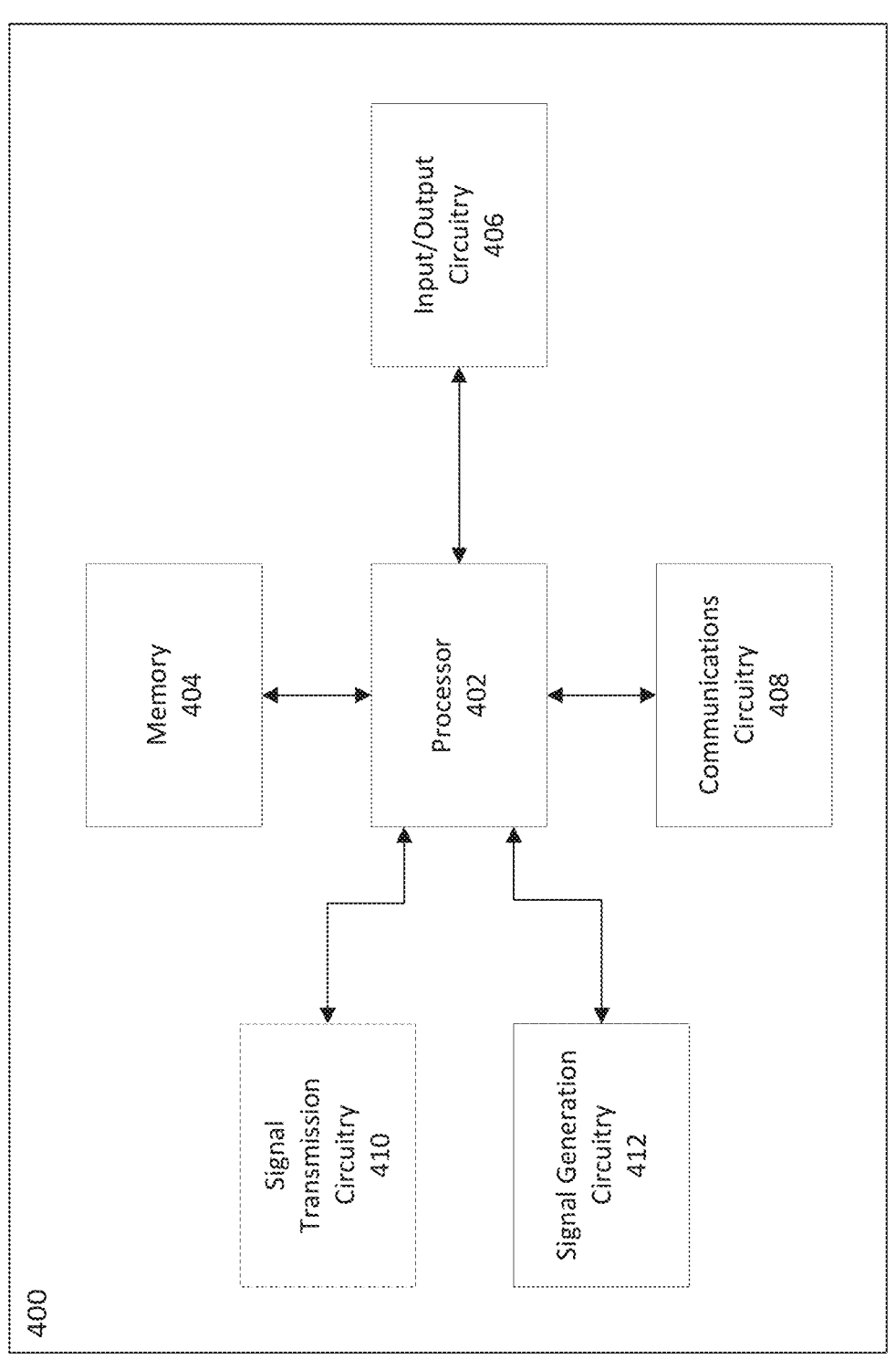
Figure 5:
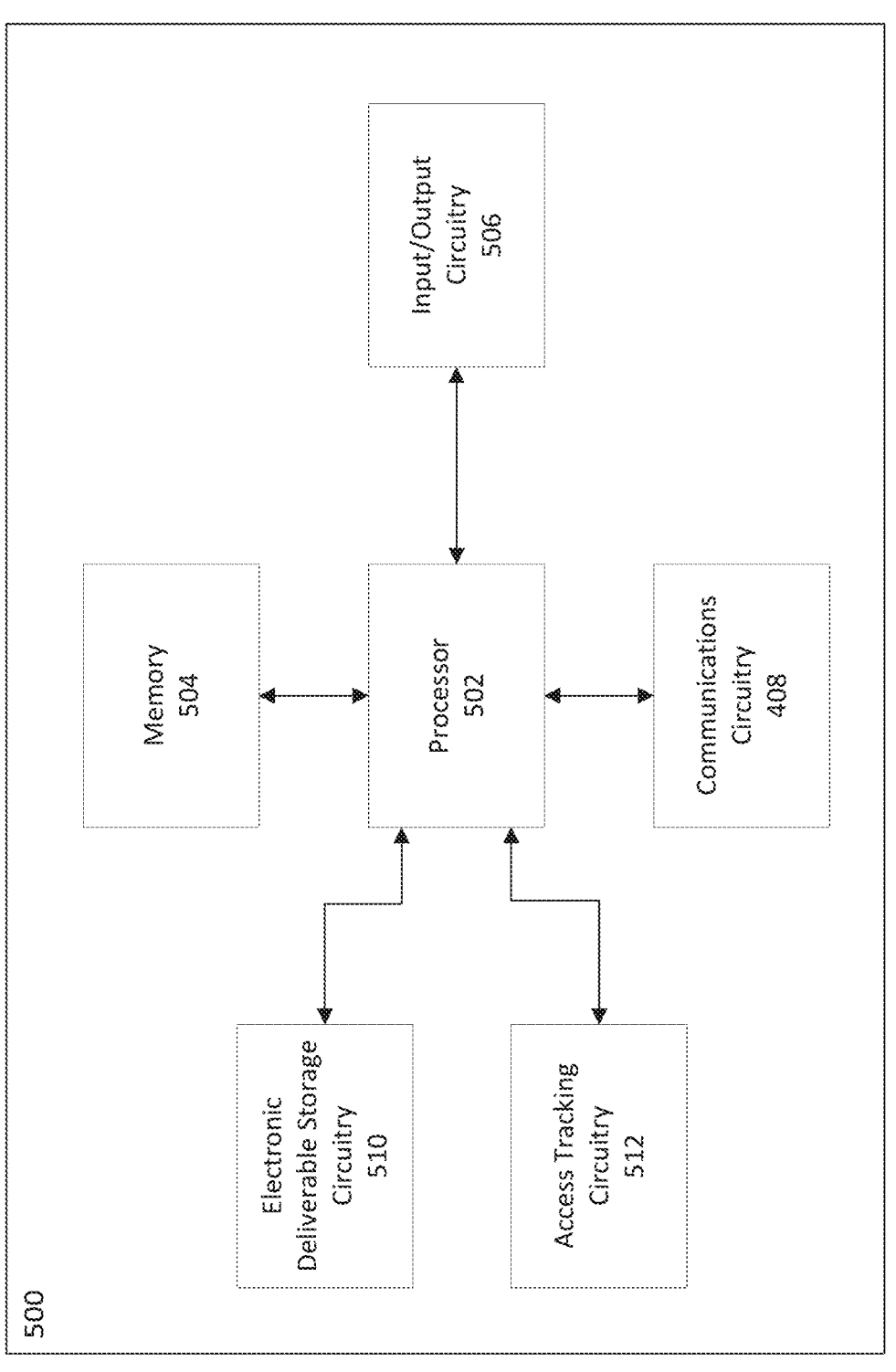
Figure 6:
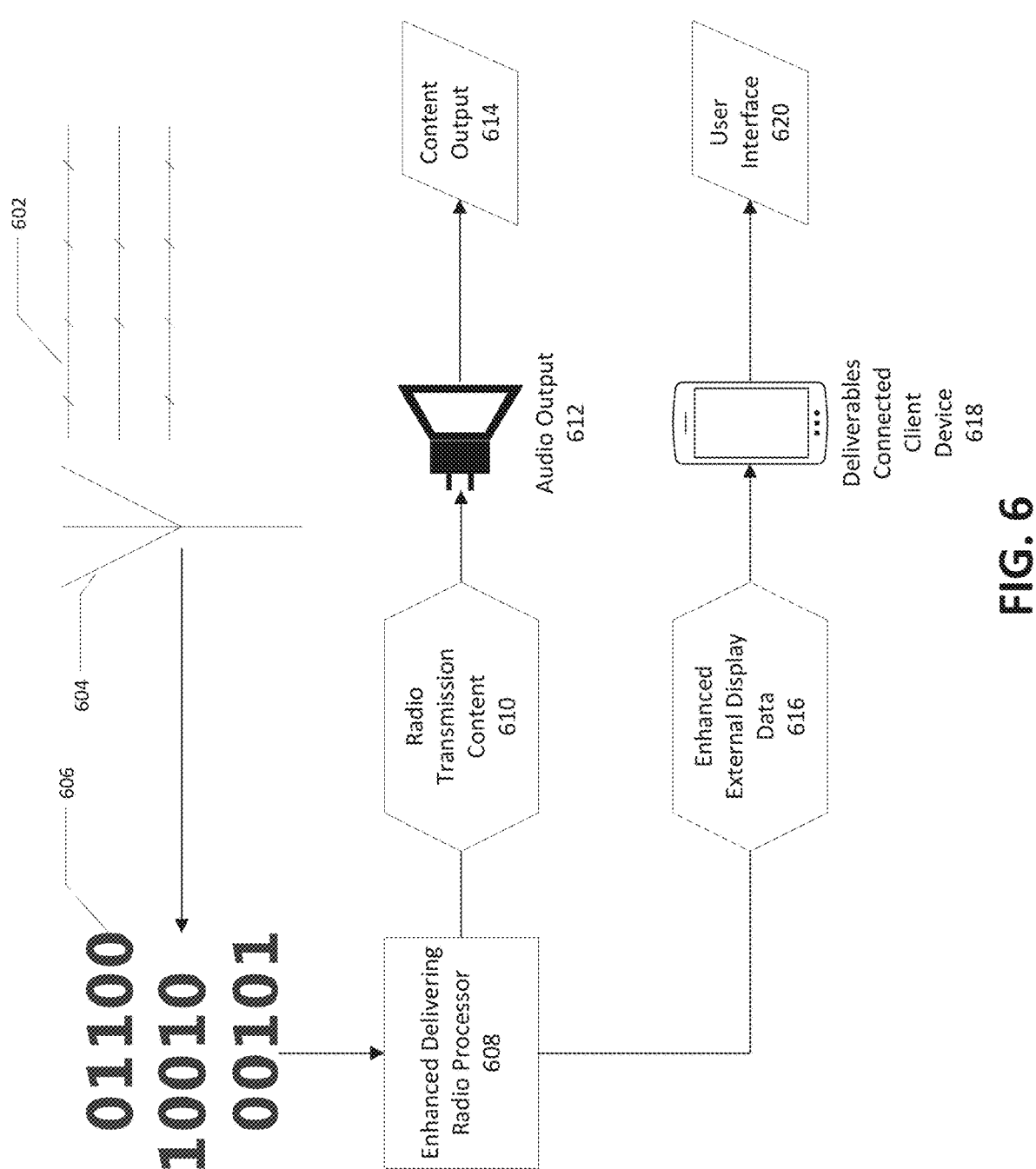
Figure 7:
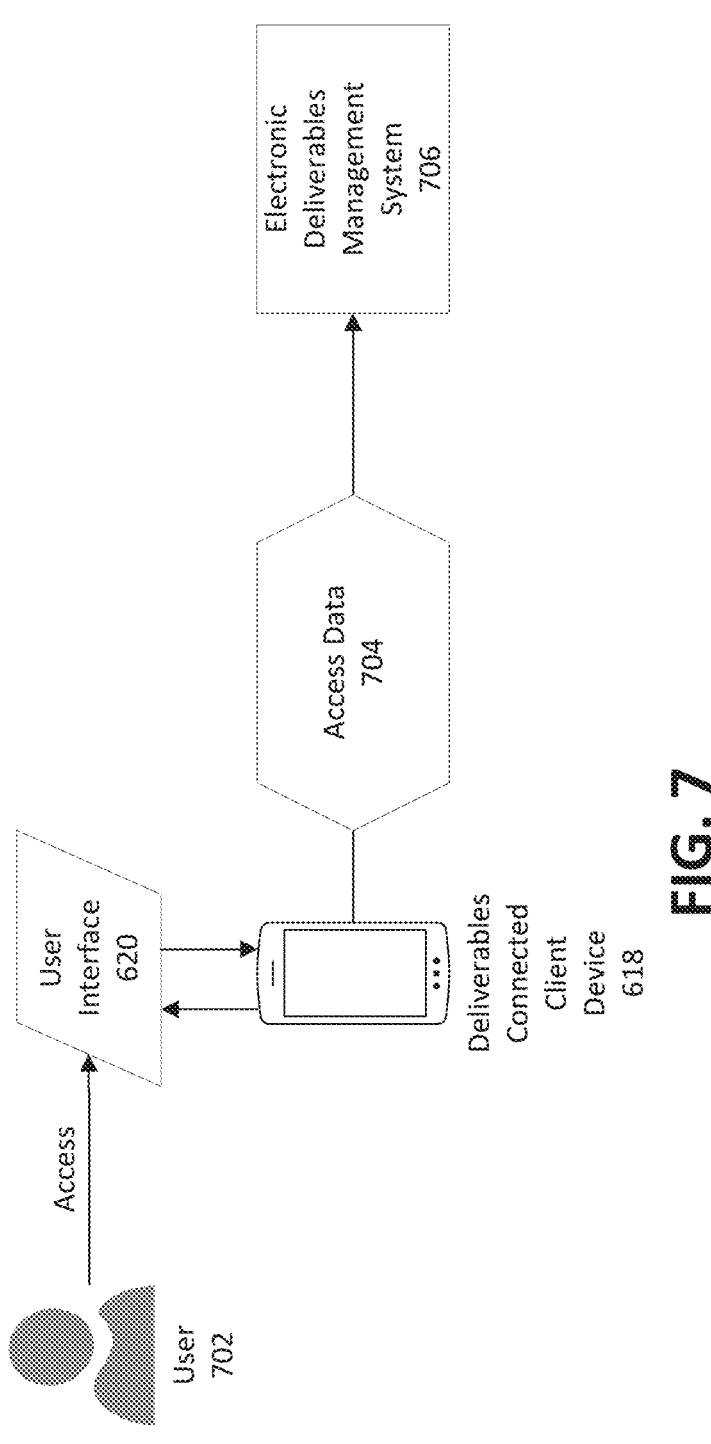
Figure 8A:
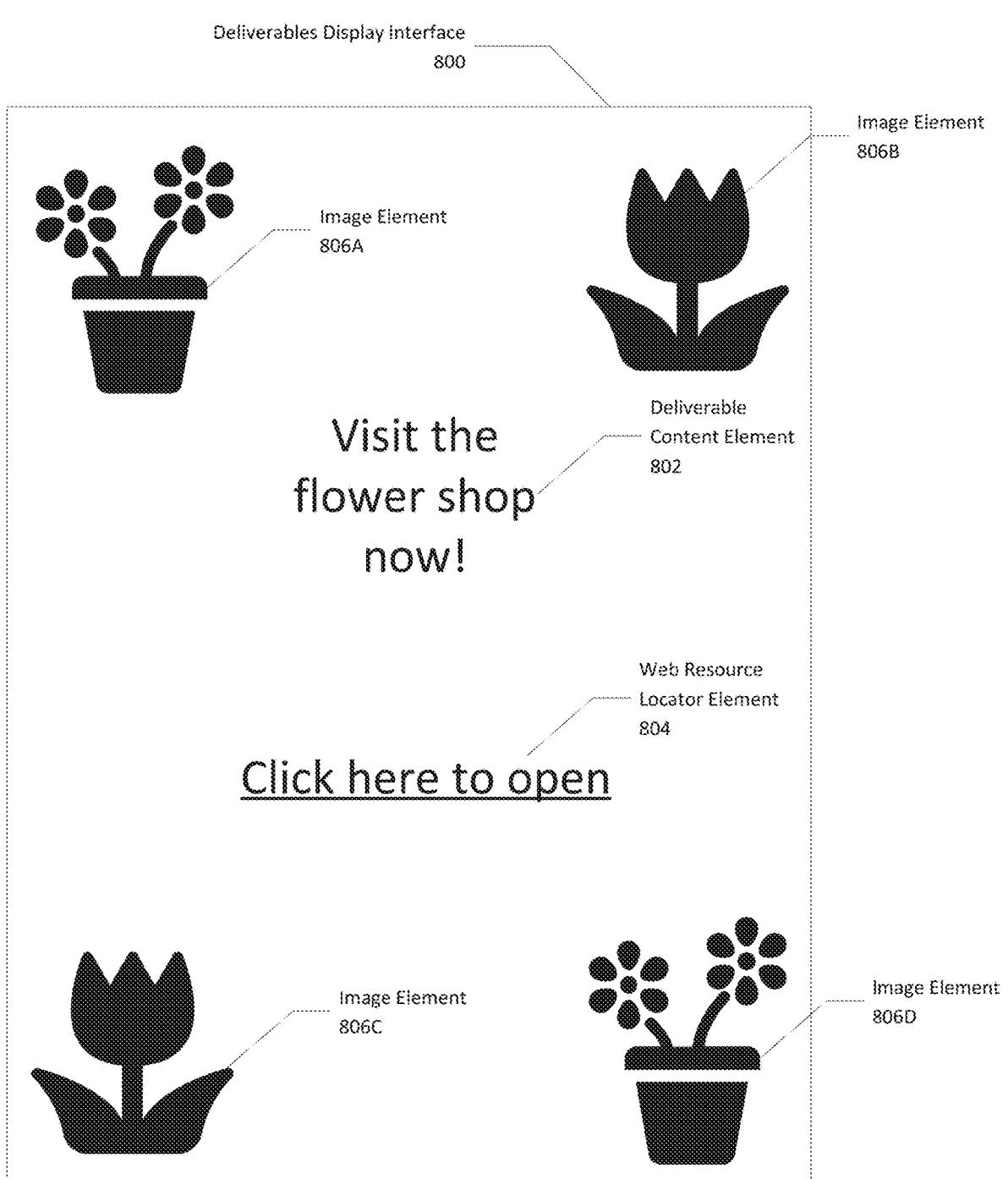
Figure 8B:
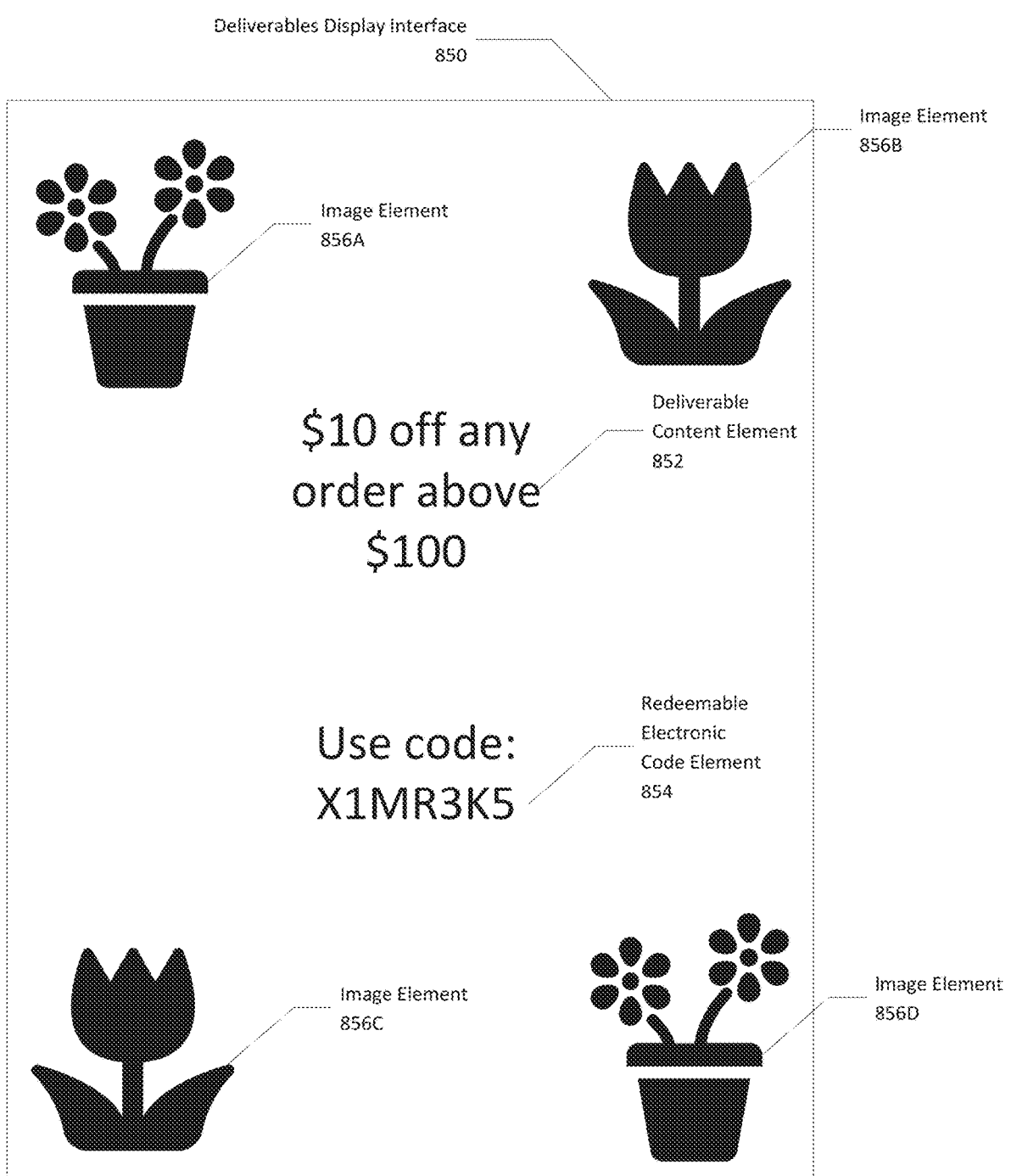
Figure 9:
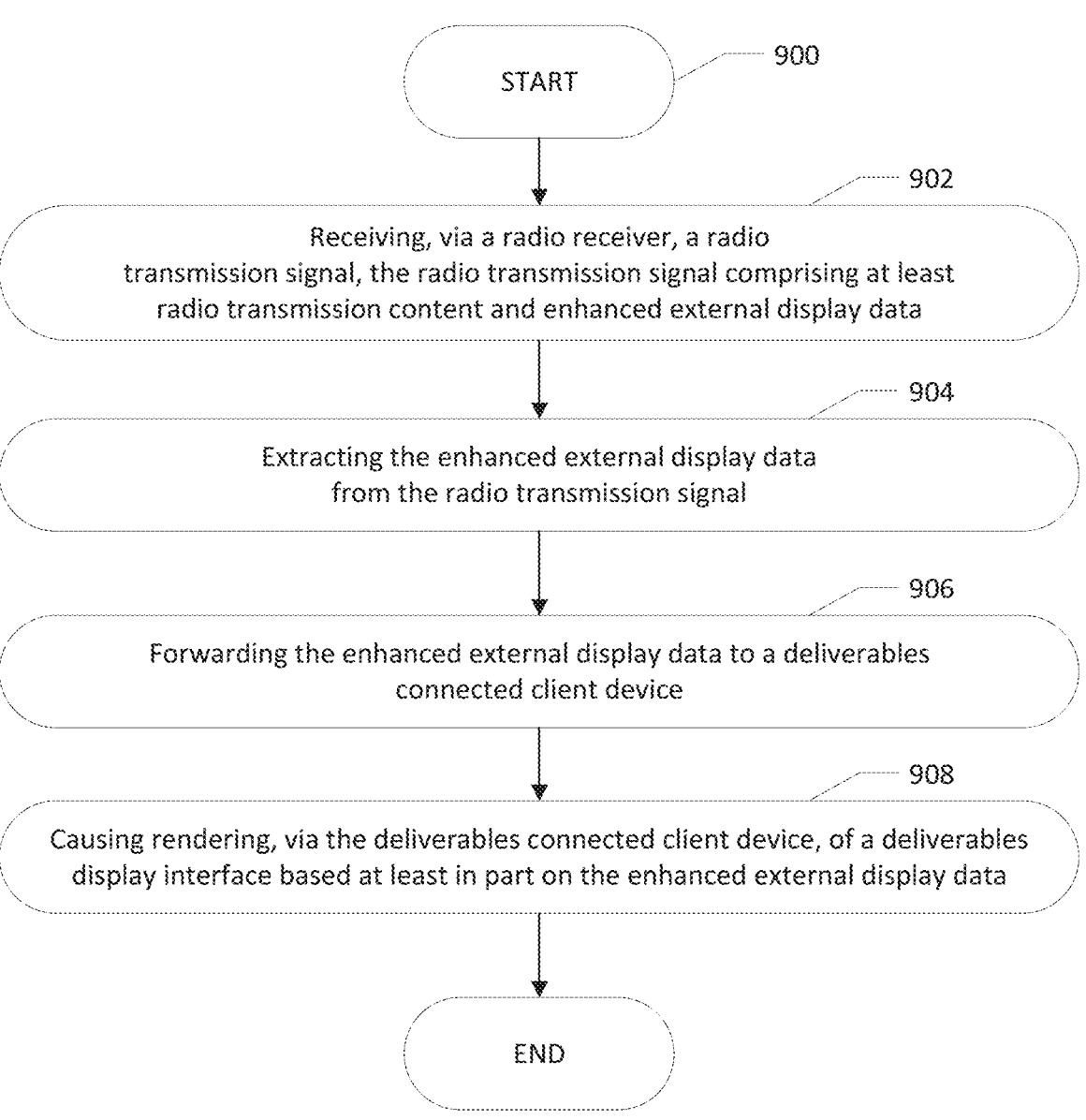
Figure 10:
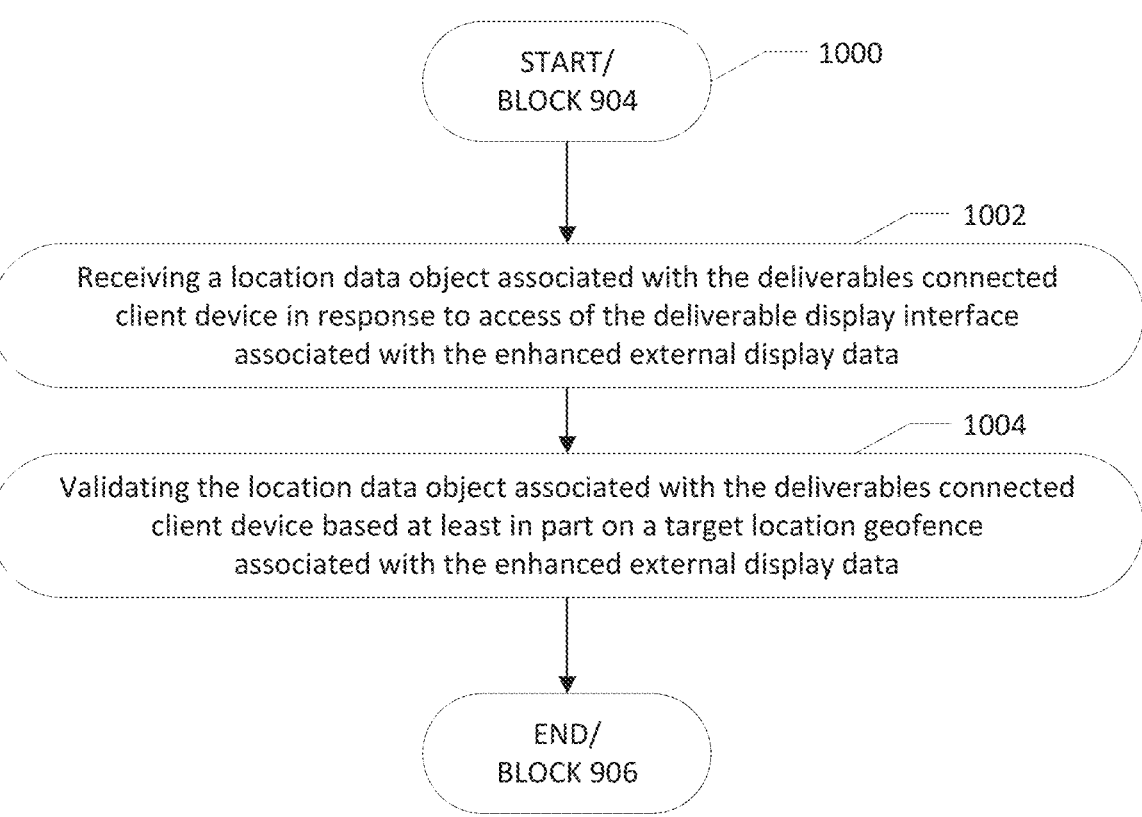
Figure 11:
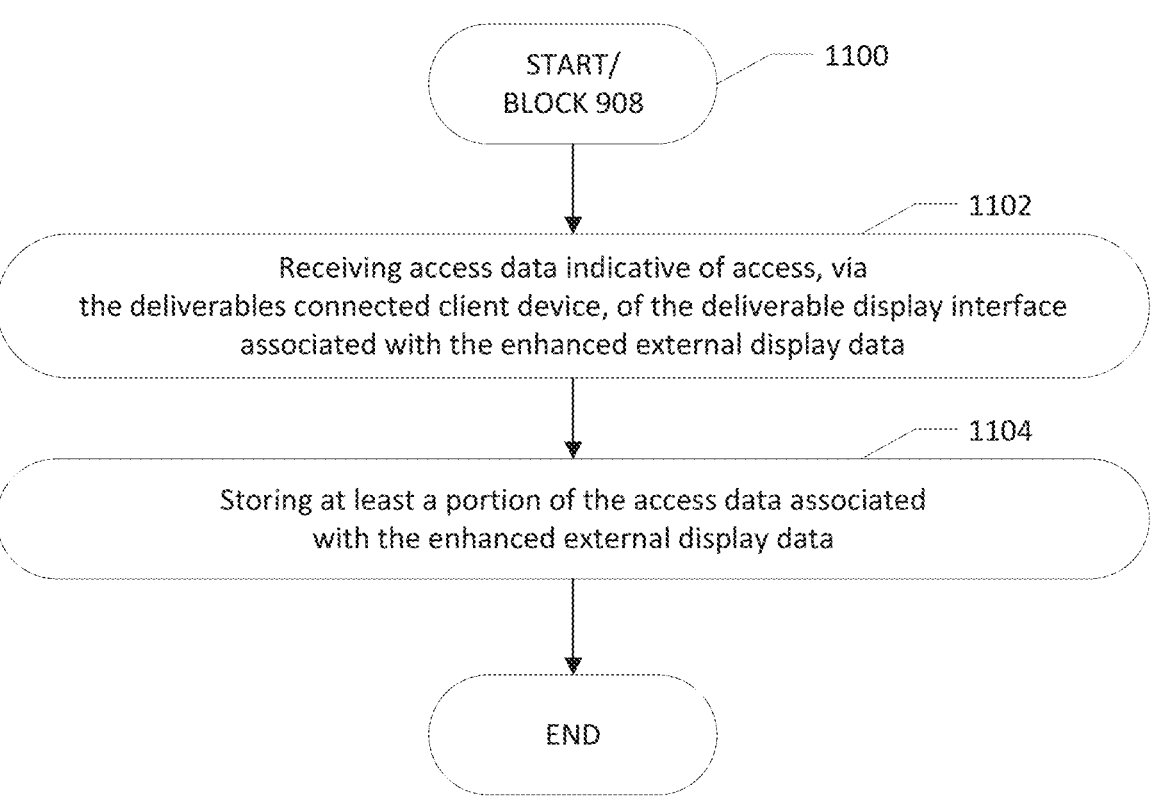
Figure 12:
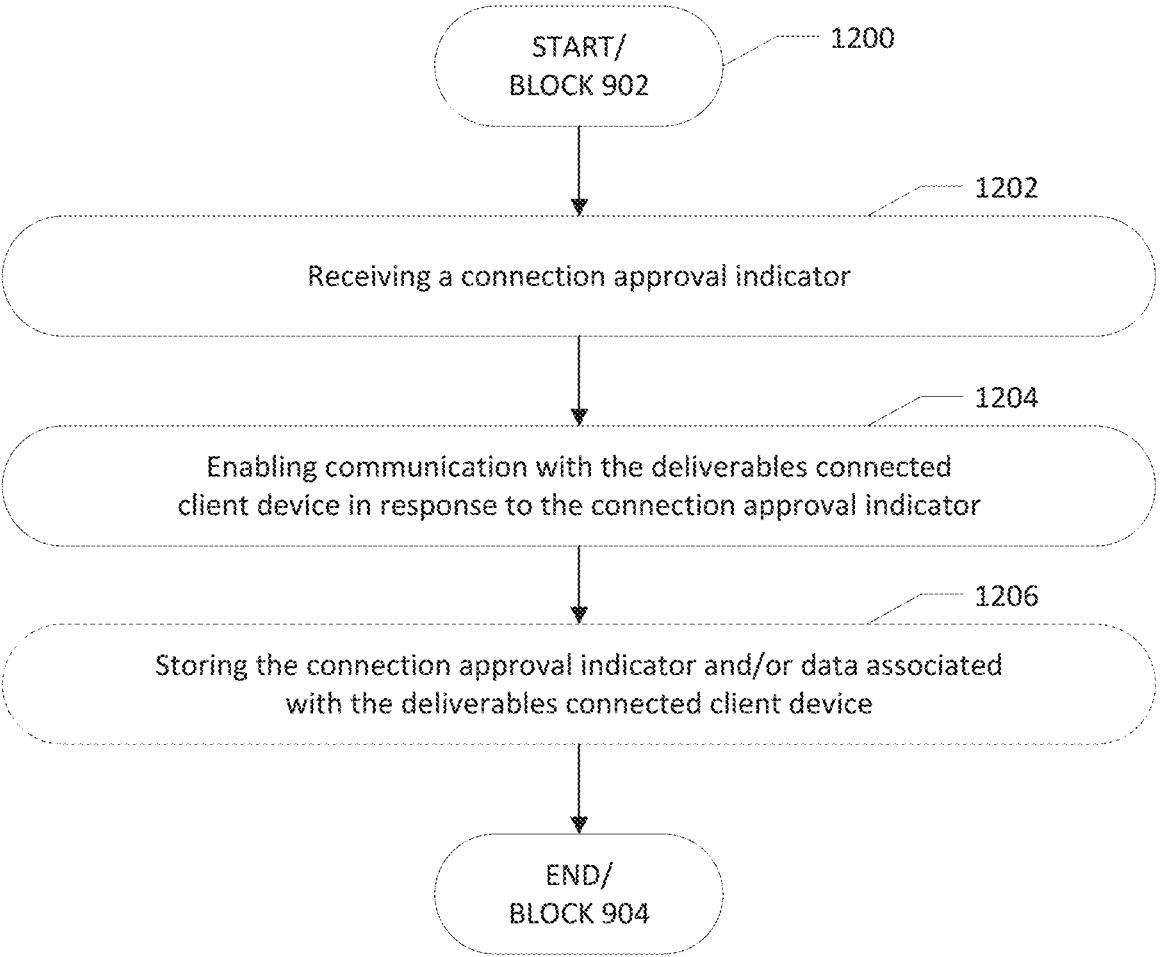

Having thus described the embodiments of the disclosure in general terms, reference now will be made to the accompanying drawings, which are not necessarily drawn to scale, and wherein:

FIG. 1 illustrates a block diagram of a system that may be specially configured within which embodiments of the present disclosure may operate;

FIG. 2 illustrates a block diagram of an example signal processor apparatus that may be specially configured in accordance with an example embodiment of the present disclosure;

FIG. 3 illustrates a block diagram of an example client device apparatus that may be specially configured in accordance with an example embodiment of the present disclosure;

FIG. 4 illustrates a block diagram of an example signal transmission apparatus that may be specially configured in accordance with an example embodiment of the present disclosure;

FIG. 5 illustrates a block diagram of an example electronic deliverables management apparatus that may be specially configured in accordance with an example embodiment of the present disclosure;

FIG. 6 illustrates a visualization representing data flow for outputting data based on enhanced radio transmission signal(s) in accordance with some example embodiments of the present disclosure;

FIG. 7 illustrates a visualization representing data flow for tracking of data associated with transmitted enhanced signal waves in accordance with at least some example embodiments of the present disclosure;

FIG. 8A illustrates an example deliverables display interface in accordance with at least some example embodiments of the present disclosure;

FIG. 8B illustrates another example deliverables display interface in accordance with at least some example embodiments of the present disclosure;

FIG. 9 illustrates a flowchart depicting example operations of an example process for processing and tracking of wirelessly transmitted signals in accordance with at least some example embodiments of the present disclosure;

FIG. 10 illustrates a flowchart depicting example operations of an example process for validating a location data object associated with a deliverables connected client device in accordance with at least some example embodiments of the present disclosure;

FIG. 11 illustrates a flowchart depicting example operations of an example process for storing access data associated with enhanced external display data in accordance with at least some example embodiments of the present disclosure; and FIG. 12 illustrates a flowchart depicting example operations of an example process for storing access data associated with enhanced external display data in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In several contexts, enhanced signal waves are wirelessly transmitted over a particular area to enable particular devices to output content of such enhanced signal waves. One such example context is radio communications occurring between a radio station and radio devices that are located in a particular area. Radio stations broadcast or otherwise transmit enhanced signal waves such that the enhanced signal waves are primarily (or exclusively) detectable within the particularly defined area. A radio device that detects the enhanced signal waves is configured to process such signals and output corresponding audio content. Such radio devices are available in many forms, including: vehicle based devices, standalone or fixed radio devices, mobile phone integrated devices, and the like.

Radio devices may be utilized to output any content broadcast by the radio station, such as songs, radio talk shows, livestreaming audio content, radio advertisements, and/or the like. Such radio devices are typically configured to output such audio content through onboard speakers.

Some newer radios may be configured to output limited metadata associated with audio content. For example, enhanced signal waves may be transmitted that include a song as well as metadata indicating the artist performing the song, the album name and/or an album coverage image, and a release year of the song. The received metadata is processed and displayed on integrated display devices supported by such newer radios. Notably, the received metadata is limited to conveying rudimentary information about a broadcast song and completely lacks the size and complexity needed to support user engagement or interactivity with the broadcast content.

One particular example context in which such deficiencies are particularly detrimental is in the context of driving user action associated with radio-transmitted advertising. Often, radio stations transmit entertainment content for some period of time, followed by a second period of time during which advertisement content is broadcast. While the entertainment content may be listened to purely for enjoyment, the advertisement content often includes a call to action or otherwise is intended to drive the end user to a particular action. For example, the advertisement content may request the user visit a particular store, access a particular web address, and/or perform some other action. The advertisement content may itself include content that serves as an incentive to prompt the user to perform the desired action. In circumstances where the advertisement content is intended to drive sales to a particular store, for example, the advertisement content may include a special code that the user may use at the store or on an online website associated therewith to receive a discount on a purchase. Even the newest radios lack capabilities to enable a user to perform many such actions directly, for example to access a particular website, receive a particular discount for use in a future purchase, and/or the like, based on the data included with a transmitted terrestrial signal. Instead, due to the several deficiencies of radio stations and radios, radio-driven advertising relies on a user to remember specific details of such advertising content (e.g., an advertiser, a website, a discount code, and/or the like) such that the user can perform the action at a later time.

Traditionally, wireless signal wave (e.g., radio signal wave) transmission and processing suffers from several additional deficiencies. It will be appreciated that at any given time, any number of radios may be sufficiently proximate to a broadcasting radio station to detect and process signal waves transmitted by the radio station. While it is theoretically and technically possible that all or none of the total number of radios in the particular area are actively listening to (e.g., detecting, processing, and outputting to a speaker) signal waves from a particular station, often the true amount of active radios listening to a particular radio station broadcast lies somewhere between such all or none boundaries. The radio station does not have any way of knowing how many radios received, processed, and outputted signal waves at a particular time. Instead, radio stations at best may attempt to estimate the number of users representing the audience that listens to the radio station at a particular time. Such estimates may be performed based on offline surveys, reporting, statistical analysis, and/or the like, which may be ineffective or untrustworthy altogether.

Such deficiencies are further compounded in certain contexts where the number of end users that receive particular content or perform an action associated therewith is relevant. For example, in the context of radio station entertainment content transmission, the radio station thereby lacks the ability to determine how many radios received and/or outputted the entertainment content to users. In the context of radio station advertisement content transmissions, however, the radio station lacks the ability to determine how many radios received and/or outputted the advertisement content to users, and further lacks the ability to determine information regarding whether users that did receive such content performed a desired action and/or are otherwise interested in the content (e.g., a number of users that received the advertisement, a number of users that indicate interest in the advertisement content, a number of users that actually performed a desired action, and/or the like).

Embodiments of the present disclosure address each of the above deficiencies and provide further improvements in the context of wireless signal wave transmission and processing (for example, radio signal wave processing). Such embodiments enable transmission, processing, and output of enhanced external display data associated with particular radio transmission content. The enhanced external display data embodies robust, detailed, additional content corresponding to the primary radio content embodied by the radio transmission content. The enhanced external display data may include data corresponding the radio transmission content that enables a device, such as a deliverables connected client device, to cause output of a specially configured deliverables display interface corresponding to the radio transmission content. In this regard, an enhanced signal wave (e.g., an enhanced radio signal wave) may be generated that includes additional data packet(s) and/or data portions as compared to a conventional signal wave (e.g., a traditional radio signal wave). Such additional data packet(s) and/or portion(s) embody and/or are associated with an electronic deliverable for providing to a user separate from primary content of the transmission. The resulting enhanced signal wave includes an alternative, and often more complex, data structure that includes separate portion(s) of data embodying enhanced external display data for processing separate from the primary content (e.g., radio content data, such as an advertisement or music). In this regard, the waves may be received and/or processed by a specially configured signal processor (e.g., an enhanced delivering radio processor) as described herein and processed to facilitate appropriate processing and output of each data portion of the enhanced signal wave transmitted over the air.

The deliverables display interface may include interface elements for accessing data indicating an entity associated with and/or that created the radio transmission content, and/or the like. In some embodiments, the deliverables display interface includes one or more interface elements that enables a user to access an electronic deliverable data object to perform a particular action associated with the radio transmission content. Some embodiments utilize particular functionality of a deliverables connected client device communicable with an enhanced delivering radio processor to enable the output of the deliverables display interface and/or the access of the deliverables display interface, such functionality additional to the functionality of the radio itself.

In some embodiments, specially configured enhanced radio signal waves are transmitted by an enhanced delivery radio transmitter (e.g., embodying a radio station) for detecting and/or processing by a specially configured enhanced delivering radio processor. In some embodiments, the enhanced delivering radio processor may include or be in communication with a radio receiver that detects the enhanced radio signal waves and forwards a representation of such signals (e.g., a digital conversion of the detected enhanced radio signal waves) as enhanced radio transmission signals to the enhanced delivering radio processor for further processing. The enhanced delivering radio processor includes or is communication with various device(s), component(s), and/or the like, to enable outputting of various portions of the enhanced radio transmission signal. In some embodiments, the enhanced delivering radio processor identifies and/or extracts various portions of the enhanced radio transmission signal, such as radio transmission content and enhanced external display data associated with an electronic deliverable. The enhanced delivering radio processor forwards the relevant extracted data portions to each of the various components for outputting by the respective components.

In some embodiments, the enhanced delivering radio processor causes one or more audio output components (e.g., one or more speakers) of or communicatively coupled with the enhanced delivering radio processor to output the radio transmission content, and forwards the enhanced external display data to a deliverables connected client device to cause the deliverables connected client device to render a deliverables display interface associated therewith. In this regard, the outputs delivered via the enhanced delivering radio processor, components thereof and/or associated therewith, and the deliverables connected client device are delivered in real-time or near-real-time (e.g., within a second) of one another such that the output is provided simultaneously. The deliverables connected client device may automatically access the deliverables display interface, may facilitate access of the deliverables display interface in response to user input, and/or the like.

Embodiments additionally or alternatively facilitate tracking of delivery and/or access of enhanced external display data associated with electronic deliverable(s). For example, in some embodiments, the enhanced delivering radio processor forwards enhanced external display data to a deliverables connected client device to cause the deliverables connected client device to transmit one or more signal(s) to an external system indicating an enhanced radio signal wave transmission associated with an electronic deliverable was received by the enhanced delivering radio processor and enhanced external display data was outputted by the deliverables connected client device.

Additionally or alternatively, in some embodiments, the deliverables connected client device transmits one or more access signal(s) to the external system upon access of a deliverables display interface associated with an electronic deliverable, such as upon access automatically or in response to user input. The access signal(s) may indicate a user has completed an action associated with an associated electronic deliverable, accessed the associated electronic deliverable and/or otherwise has an interest in the associated electronic deliverable. In this regard, embodiments of the present disclosure provide enhanced functionality with respect to robust digital content delivery, tracking of digital content delivery, facilitation of user action, and tracking of user action, in circumstances where such functionality previously failed to exist.

In one particular example context, a user Andy may be operating a car that includes a head unit (for example as part of a stereo system) embodying a specially configured enhanced delivering radio processor in accordance with embodiments of the present disclosure. The head unit is connected via a wired or wireless communication protocol to user Andy's mobile smart phone executing a specially configured native or web app, where the mobile smart phone executing the specially configured app embodies a deliverables connected client device. As user Andy is listening to a particular radio station, the head unit may output advertising content associated with one or more particular provider(s) offering services to radio listeners like user Andy. The advertisement may offer a special discount in circumstances where the radio listeners access the provider's website and make a purchase utilizing a particular promotional code.

Simultaneously with outputting the audio content of the advertisement via speakers of or associated with an enhanced delivering radio processor (e.g., the specially configured head unit of a radio system, a vehicle, and/or the like), the enhanced delivering radio processor (e.g., the specially configured head unit) extracts and forwards particular enhanced external display data to user Andy's mobile smart phone. Such transmission causes user Andy's mobile smart phone to render a deliverables display interface based on the particular enhanced external display data, which may include specific interface elements associated with the provider, the promotional code, a web link to the website of the provider, and/or the like. Automatically or in response to input from user Andy, the deliverables display interface is accessed via the mobile smart phone, and user Andy may save or receive a permanent notice including the promotional code, access the website immediately via the mobile smart phone, and/or otherwise be able to complete the purchase associated with the audio advertisement in minimal user input and no excess knowledge required by user Andy.

The particular embodiments and data flow described herein enables such operations to be performed regardless of whether particular computing devices include each of the involved communication capabilities. For example, in some such embodiments, the enhanced delivering radio processor need not include long-range cellular or Internet processing capabilities. Similarly, the deliverables connected client device need not include radio receiving and/or processing capabilities. In this regard, in some such embodiments, existing hardware implementations (e.g., existing radio devices and/or client devices) may be specially configured utilizing firmware and/or software to perform the operations described herein without altering the hardware configuration of such device(s). Additionally or alternatively, some such embodiments enable cloud-based or wireless deployment of such functionality without requiring retrieval and/or forfeiture of the device(s) by end users.

As user Andy continues listening to the radio station, multiple advertisements may be run by the radio station. As the enhanced radio signal waves transmitted by the radio station are updated to a new advertisement, the head unit continues to forward new enhanced external display data to the mobile smart phone that causes simultaneous, real-time updating of the deliverables display interface rendered via the mobile smart phone. In this regard, the deliverables display interface accessible via the deliverables connected client device remains up-to-date with the associated audio content simultaneously being outputted via other components of the head unit.

In some embodiments, a system of the radio station or an associated external system may receive signal(s) indicating one or more points of this data flow. In some embodiments, for example, an electronic deliverables system embodied within or associated with the radio station receives signal(s) from the deliverables connected client device upon the deliverables connected client device receiving the enhanced external display data or upon rendering of a deliverables display interface associated therewith. Additionally or alternatively, in some embodiments, the electronic deliverables system embodied within or associated with the radio station receives signal(s) from the deliverables connected client device upon access of the deliverables display interface via the deliverables connected client device.

It will be appreciated that the deliverables connected client device may be specially configured to enable signal(s) to be provided indicating completion of any step of receiving enhanced external display data, processing enhanced external display data, outputting corresponding deliverables display interface(s), accessing such deliverables display interface(s), and/or the like, for any number of users. In this regard, the electronic deliverables system may track any of such events for any number of users, and/or process the data to perform any of a myriad of determinations based on such data. Such determinations include a number of listeners, a number of devices that received the enhanced external display data and/or rendered a corresponding deliverables display interface, a number of devices and/or users that accessed data associated with a particular electronic deliverable (e.g., indicating interest in the electronic deliverable), location data associated with access of one or more electronic deliverable(s), biographical information associated with users that access a particular electronic deliverable, category of electronic deliverable, or all electronic deliverables generally, and/or the like.

A digital reach of a transmission (e.g., a number of device(s) and/or user(s) received the transmission) advantageously may be more accurately determined in a manner that traditional signal processing does not and cannot provide. Similarly, an effective digital reach of a transmission (e.g., a number of device(s) and/or user(s) that accessed data associated with the transmission) advantageously may be more accurately determined as well in a manner that traditional signal processing does not and cannot provide.

Some embodiments enable transmission and providing of electronic deliverables in a manner that enables processing by low processing power enhanced delivering radio processor(s) and/or otherwise legacy/low-tech enhanced delivering radio processor(s). For example, in many contexts a user possesses and/or otherwise utilizes a user device (e.g., a cell phone) that embodies a deliverables connected client device with respect to an enhanced delivering radio processor of their vehicle (e.g., connected to their car stereo system). Some such embodiments of the present disclosure provide for processing of signal(s) in a manner that enables minimal complex processing by the enhanced delivering radio processor itself, enabling performance of such operation(s) by less technically complex, less computing powerful, and less costly head unit(s) and/or other enhanced delivering radio processor(s). Such embodiments leverage the more powerful implementations of the deliverables connected client device likely to be in the user's possession anyway.

Some embodiments of the present disclosure further provide advantages with respect to securing delivery of particular data transmissions within a defined area corresponding to a target location geofence. For example, some embodiments enable determination and/or processing of location data associated with deliverables connected client devices that receives enhanced external display data. The location data associated with such deliverables connected client device(s) may be validated to ensure that such location(s) represented by the location data fall within the target location geofence. Such embodiments ensure that specific details and/or additional content, such as deliverables display interface(s), associated with radio transmission content is outputted in circumstances where the deliverables connected client device is confirmed within a target location geofence. In circumstances such as advertisement delivery, such functionality may prevent users outside a target area where a promotional code is accepted (for example) to accessing said promotional code via a deliverables display interface, while simultaneously providing the promotional code via a deliverables display interface to users within the target area.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "user" refers to an entity controlling one or more device(s). Non-limiting examples of a user include a person, an organization, or a group of people in control of a client device having access to a communications network. A user is associated with a "user identifier" and/or "user profile" that uniquely represent the user within a computing environment.

The term "signal processor" refers to any number of computing devices embodied in hardware, software, firmware, and/or any combination thereof, that receives and processes a particular transmitted signal. A signal processor processes incoming transmission signals encoded via one or more particular transmission protocols, and outputs one or more portions of data based on the incoming transmission signals.

The term "enhanced delivering radio processor" refers to a signal processor that receives and/or processes enhanced radio transmission signals defined over one or more radio frequency bands and/or encoded utilizing one or more radio signal transmission protocols. Non-limiting examples of enhanced delivering radio processors include a standalone radio box, a vehicle head unit (e.g., an automobile head unit, a boat head unit, and/or an aerial vehicle head unit), and radio circuitry of a mobile device.

The term "enhanced signal wave" refers to an over-the-air transmitted wireless signal associated with a particular frequency range and/or a particular communications protocol that represents data transmitted from a source system and includes data representing enhanced external display data for processing. In some embodiments, an enhanced signal wave is transmitted over a long range defining a particular geographic area (e.g., a radius of miles from a transmitter). An enhanced signal wave is detectable and/or otherwise capturable to generate a corresponding digital and/or analog signal. The term "enhanced radio signal wave" refers to an enhanced signal wave embodying radio data that is transmitted by a radio transmission system using radio frequencies and/or radio communications protocols.

The term "transmission channel" refers to a portion of a modulated enhanced signal wave. A transmission channel includes a particular portion that represents particular corresponding digital data. In a non-limiting example context, an enhanced signal wave includes a first transmission channel associated with audio content to be outputted by a speaker of a radio, a second transmission channel associated with artist information corresponding to the audio content, a third transmission channel associated with image data corresponding to the audio content (e.g., album art), and a fourth transmission channel representing enhanced external display data corresponding to the audio content.

The term "radio data system protocol" refers to any encoding standard for transmitting enhanced radio signal wave(s) capable of being detected and/or processed by one or more corresponding enhanced delivering radio processors configured for decoding the encoding standard. Non-limiting examples of a radio data system protocol include the radio broadcast data system communications protocol utilized for transmitting FM radio broadcasts.

The term "radio receiver" refers to hardware and/or a combination of hardware, software, and/or firmware, that wirelessly detects and/or otherwise receives wirelessly transmitted enhanced radio signal waves and interprets such enhanced radio signal waves into a processable format. In a non-limiting example context, for example, a radio receiver includes an antenna that detects such an enhanced radio signal wave and interprets the enhanced radio signal wave, via a corresponding head unit, to produce a corresponding digital signal.

The term "enhanced radio transmission signal" refers to a digital signal that represents a wirelessly transmitted enhanced radio signal wave. An enhanced radio transmission signal includes enhanced external display data in addition to radio transmission content, each to be output via different devices and/or subsystems of a particular system. In some contexts, an enhanced radio signal wave is encoded via a particular protocol that is decoded based on the particular protocol to generate the corresponding enhanced radio transmission signal.

The term "radio transmission content" refers to electronically managed audio and/or visual data representing radio content outputted via an enhanced delivering radio processor. Non-limiting examples of radio transmission content includes audio data outputted via a speaker of an enhanced delivering radio processor, visual data outputted via a display of an enhanced delivering radio processor, and/or a combination thereof.

The term "enhanced external display data" refers to electronically managed data associated with an electronic deliverable corresponding to radio transmission content for outputting via a deliverables connected client device communicable with an enhanced delivering radio processor. Enhanced external display data is transmissible to the deliverables connected client device from an enhanced delivering radio processor to cause the deliverables connected client device to process the enhanced external display data. Non-limiting examples of enhanced external display data includes audio/visual data associated with an electronic deliverable corresponding to radio transmission content, where such audio/visual data is outputted via a smartphone connected to the enhanced delivering radio processor. Additionally, other non-limiting examples of enhanced external display data includes resource identifier data utilizable for retrieving audio/visual data associated with an electronic deliverable corresponding to radio transmission content.

The term "deliverables connected client device" refers to one or more user-facing computing devices embodied in hardware, software, firmware, and/or a combination thereof that is capable of establishing connectivity with an enhanced delivering radio processor, and is capable of receiving data from the enhanced delivering radio processor while connected to the enhanced delivering radio processor.

The term "deliverables display interface" refers to a user interface including one or more interface element(s) specially configured based on enhanced external display data received from an enhanced delivering radio processor and associated with a particular electronic deliverable. A deliverables display interface is associated with a particular electronic deliverable that corresponds to particular received enhanced external display data.

The term "client device connectivity application" refers to a layer of software, firmware, hardware, and/or a combination thereof, that enables transmission of particular data between an enhanced delivering radio processor and a deliverables connected client device. In some embodiments, a client device connectivity application is provided and/or otherwise made available by an entity associated with the deliverables connected client device and/or particular configuration(s) of enhanced delivering radio processor. Non-limiting examples of a client device connectivity application include CarPlay made available by Apple Inc. of Cupertino, California, and Android Auto made available by Google LLC of Mountain View, California.

The term "wired connection" refers to a physical connection between two computing devices over one or more wires that facilitate transmissions between the two computing devices.

The term "close-range wireless connection" refers to a wireless connection established between two computing devices utilizing one or more wireless communication protocols capable of communicating over a defined range. A wireless connection may be established even in circumstances where the communication between the two computing devices is not continuous (e.g., so long as the two computing devices can identify and transmit to one another). Non-limiting examples of a close-range wireless connection include a Bluetooth connection, a ZigBee connection, a personal area network connection, and a custom communication connection utilizing a custom communication protocol.

The term "vehicle head system" refers to a particular enhanced delivering radio processor embodied by a head unit of a vehicle. In some embodiments, a vehicle head system is embodied by or included in an infotainment system of a particular vehicle. Non-limiting examples of a vehicle head system include a head unit of a car, a truck, a motorcycle, a recreational vehicle (RV), a bus, an all-terrain vehicle, another automobile, a boat, another watercraft, an airplane, a helicopter, and another aircraft.

The term "electronic deliverable" refers to data embodying or utilized to configure enhanced external display data for processing associated with particular transmission content. In some embodiments, the electronic deliverable includes or is associated with particular enhanced external display data that facilitates rendering of a particular interface associated with corresponding radio transmission content, the particular interface for outputting via a client device. In some embodiments, the electronic deliverable enables access to particular data, resources, and/or information associated with the corresponding radio transmission content. In some embodiments, an electronic deliverable enables redemption of a particular electronic deliverable code.

The term "redeemable deliverable code" refers to electronically managed data embodying a promotion, discount, incentive, or other data representation that is redeemable to alter one or more aspects of a transaction. In some embodiments an electronic deliverable includes or is associated with a redeemable deliverable code.

The term "web resource locator" refers to electronically managed data usable to identify, retrieve, and/or otherwise access a resource, information, and/or other data corresponding to radio transmission content.

The term "display data" refers to electronically managed data that embodies and/or is utilized to configure one or more interface element(s) to be rendered and/or otherwise outputted via a deliverables display interface. Non-limiting examples of display data includes image data to be included in the deliverables display interface, text data to be included in the deliverables display interface, deliverable content data to be included in the deliverables display interface, a redeemable deliverable code to be included in the deliverables display interface, a web resource locator to be included in the deliverables display interface, and audio data to be outputted together with the deliverables display interface.

The term "location data object" refers to electronically managed data representing the location of a particular computing device. Non-limiting examples of a location data object include a global positioning satellite location, a triangulated location, a latitude and longitude coordinate, and a relate position coordinate.

The term "target location geofence" refers to electronically managed data defining a particular geographic area within which a deliverables display interface should be made available, and/or within which a corresponding redeemable deliverable code is redeemable. Non-limiting examples of a target location geofence include a geographic area defined by a radius from a particular location data object, a geographic area defined by a set of boundary location data objects, and/or a geographic area defined by a range of a transmitted enhanced radio signal wave.

The term "validating" when used with respect to a particular location data object refers to determining whether the particular location data object falls within the target location geofence. A particular location data object may be "validated" or otherwise "satisfy validation" in circumstances where the particular location data object falls within the target location geofence.

The term "access data" refers to electronically managed data indicating a deliverables connected client device accessed a deliverables display interface. The deliverables connected client device may access a deliverables display interface automatically, or in response to user interaction with the deliverables display interface and/or particular elements thereof. In some embodiments, access data includes a data identifier associated with the deliverables connected client device, timestamp data indicating the date and/or time of access, a location data object associated with the deliverables connected client device at the time of access, and/or user information associated with the user of the deliverables connected client device at the time of access.

The term "connection approval indicator" refers to electronically managed data indicating authorization of connectivity between a deliverables connected client device and one or more enhanced delivering radio processor(s). In some embodiments, a user authorizes such connectivity between a deliverables connected client device and an enhanced delivering radio processor to enable transmission of data between the deliverables connected client device and the enhanced delivering radio processor.

Example Systems and Apparatuses of the Disclosure

Example systems and apparatuses of the disclosure will now be described. It will be appreciated that such systems and/or apparatuses interact to provide the various technical advantages described herein with respect to improved signal processing, signal reception and/or engagement tracking, and/or improved display generation and output. Additionally or alternatively, it will be appreciated that some embodiments further provide various non-technical advantages as well, for example with respect to determining advertisement return on investment and/or effectiveness.

FIG. 1 illustrates a block diagram of a system that may be specially configured within which embodiments of the present disclosure may operate. Specifically, FIG. 1 depicts an example system 100 configured to enable transmission of specially configured wireless enhanced signal waves, processing of such signals for outputting deliverables display interface(s), and/or tracking of reception and/or interaction with data associated with enhanced signal waves. The system 100 includes a radio transmission system 106 associated with a signal transmitter 108, an enhanced delivering radio processor 102 associated with a radio receiver 110, a deliverables connected client device 112, and an electronic deliverables management system 114. The radio transmission system 106 via the signal transmitter 108 transmits enhanced signal waves, such as the enhanced radio signal waves 116, that are received by the enhanced delivering radio processor 102 via the radio receiver 110. The enhanced delivering radio processor 102 is communicable with one or more devices, such as the connected computing device, over the communications network 118. The electronic deliverables management system 114 may be optional in some embodiments. In such embodiments including the electronic deliverables management system 114, the electronic deliverable management system 114 may communicate with the deliverables connected client device 112 over a communications network 120. Additionally or alternatively, in some embodiments, the electronic deliverables management system 114 communicates with the radio transmission system 106 over the communications network 120 or a separate communications network (not depicted).

It will be appreciated that, in other embodiments, one or more other signal types are processed in the manner described herein. Such signal types may include any other signal(s) transmitted over a defined region (e.g., utilizing other frequency ranges), wireless signals for accessing the Internet, and/or the like. For example, in other embodiments, a signal processor may similarly receive and extract content transmission data and enhanced external display data for processing with respect to Internet radio transmissions, Internet video transmissions, satellite radio transmissions, and/or the like. In this regard, the particular contexts of radio transmissions as described herein is exemplary and not to limit the scope and spirit of the present disclosure.

The enhanced delivery radio transmitter 108 includes one or more computing device(s) embodied in hardware, software, firmware, and/or a combination thereof, that generates, outputs, and/or otherwise emits enhanced radio signal wave(s). The enhanced radio signal waves may be emitted, generated, and/or otherwise output wirelessly with a certain signal strength, such that the enhanced radio signal wave(s) may be detected and/or otherwise received by any number of devices within a particular area and/or devices that are configured (e.g., utilizing hardware, software, and/or firmware) to enable such detection, receiving, and/or capture of the enhanced radio signal wave(s). In some embodiments, the enhanced delivery radio transmitter 108 may be activated at a particular signal strength level associated with a particular defined geographic area.

The radio transmission system 106 includes one or more computing device(s) embodied in hardware, software, firmware, and/or a combination thereof, that provides enhanced signal wave generation and transmission functionality, and/or functionality for controlling an associated enhanced delivery radio transmitter, such as the enhanced delivery radio transmitter 108. Such functionality includes generation of data for transmission, determination of particular data for transmission, and/or transmission of identified data via the enhanced delivery radio transmitter 108. In some embodiments, the radio transmission system 106 encodes, modulates, and/or otherwise alters one or more portions of digital data to be transmitted. Additionally or alternatively, in some embodiments, the radio transmission system 106 activates the enhanced delivery radio transmitter 108 to cause the enhanced delivery radio transmitter 108 to emit, output, and/or otherwise generate one or more enhanced radio signal wave(s) representing such data for transmission. The radio transmission system 106 may activate the enhanced delivery radio transmitter 108 to cause emission of enhanced radio signal waves corresponding to a defined target geographic area, such that target devices within the defined geographic area are expected to be able to detect, receive, and/or otherwise capture the transmitted enhanced radio signal wave. In one example context, the radio transmission system 106 is embodied by computing system(s) associated with operation of a radio station. It should be appreciated that, in other embodiments, an alternative signal transmissions system similar to the radio transmission system 106 may transmit alterative types of enhanced signal waves (e.g., utilizing alternative hardware and/or protocols) in a similar manner without deviating from the scope and spirit of this disclosure.

The radio receiver 110 includes one or more computing device(s) embodied in hardware, software, firmware, and/or a combination thereof, that detects, receives, and/or otherwise captures enhanced radio signal wave(s). The radio receiver 110 may receive enhanced radio signal wave(s) that have been transmitted by the enhanced delivery radio transmitter 108 in circumstances where the radio receiver 110 is within a particular geographic area. In some embodiments, the radio receiver 110 is embodied by an antenna that detects, demodulates, and/or otherwise receives and reads enhanced radio signal waves transmitted over the air. It should be appreciated that the radio receiver 110 may be activated to detect, capture, and/or otherwise receive enhanced radio signal wave(s) within a particular area based on the power level, strength of activation, and/or other properties of the radio receiver 110. For example, in some embodiments, the radio receiver 110 is configured to enable detection, capturing, and/or receiving of enhanced radio signal wave(s) transmitted over a larger radius by increasing one or more properties of the radio receiver 110, such as increasing the effective area of a receiving antenna.

The enhanced delivering radio processor 102 includes one or more computing device(s) embodied in hardware, software, firmware, and/or a combination thereof, that provides enhanced signal wave receiving and processing functionality, and/or enhanced external display data processing functionality. Such functionality includes activation of the radio receiver 110 and/or receiving of an enhanced radio transmission signal representing an enhanced radio signal wave detected, received, and/or otherwise captured by the radio receiver 110. Additionally or alternatively, such functionality includes extracting one or more data portions from the enhanced radio transmission signal, for example enhanced external display data and/or radio transmission content. Additionally or alternatively, such functionality includes forwarding enhanced external display data to a deliverables connected client device and/or otherwise causing output by the deliverables connected client device of particular data base at least in part on the enhanced external display data. Additionally or alternatively, such functionality includes verifying location data object(s) associated with deliverables connected client device(s). Additionally or alternatively, in some embodiments, such functionality includes receiving connection approval indicator(s) and/or enabling communication between the enhanced delivering radio processor 102 in response to received connection approval indicator(s).

In some embodiments, the enhanced delivering radio processor 102 and the radio receiver 110 are embodied by a single computing system. For example, in some embodiments, the radio receiver 110 and the enhanced delivering radio processor 102 are embodied by a user-facing radio. Alternatively or additionally, in some embodiments, the enhanced delivering radio processor 102 alone or in combination with the radio receiver 110 is/are embodied by a head unit, for example a head unit or infotainment system of a vehicle. In other embodiments, the enhanced delivering radio processor 102 and radio receiver 110 are embodied by separate devices and/or components communicatively coupled with one another (e.g., connected via external or internal wiring) to enable communication of data between such devices. For example, the radio receiver 110 may embody an external antenna connected via a wire to an enhanced delivering radio processor 102 embodying a vehicle head unit.

The deliverables connected client device 112 includes one or more computing device(s) embodied in hardware, software, firmware, and/or a combination thereof, that provides processing and/or user-facing input/output functionality to one or more particular client(s). Such functionality may include receiving enhanced external display data and/or other data forwarded from the enhanced delivering radio processor 102. Additionally or alternatively, in some embodiments, such functionality may include rendering of one or more deliverables display interface(s) caused by and/or otherwise associated with data received from the enhanced delivering radio processor 102. Additionally or alternatively, in some embodiments, such functionality may include enabling, and/or receiving data indicative of, access of deliverables display interface(s) and/or portions thereof rendered thereto.

In some embodiments, the deliverables connected client device 112 is embodied by one or more specially configured user device(s). For example, in some embodiments the deliverables connected client device 112 is embodied by a user's smartphone, tablet, personal computer, laptop, smartwatch, wearable, smart device, Internet-of-Things-enabled device, and/or the like. In some embodiments, the deliverables connected client device 112 is specially configured via one or more software application(s) installed and/or otherwise accessible to the deliverables connected client device 112. Such software application(s) may include a native software application installed to and executed via the deliverables connected client device 112 that provides the functionality described with respect to deliverables connected client device 112. Alternatively or additionally, in some embodiments, such software application(s) include a browser application installed to and executed via the deliverables connected client device 112 that provides access to web application(s) specially configured to perform the described functionality. For example, in some embodiments the browser application may be directed (e.g., manually or automatically based at least in part on enhanced external display data received from the enhanced delivering radio processor 102) to particular web service(s) that provide such functionality.

In some embodiments, the deliverables connected client device 112 interacts with the enhanced delivering radio processor 102 via a client device connectivity application. The client device connectivity application may embody an interpretive layer that provides data transfer capabilities between the deliverables connected client device 112 and the enhanced delivering radio processor 102. In some embodiments, the client device connectivity application executes entirely in software and/or firmware of the enhanced delivering radio processor 102 and/or the deliverables connected client device 112. For example, the deliverables connected client device 112 may utilize a particular client device connectivity application to communicate with the enhanced delivering radio processor 102 in a particular manner based at least in part on the make, the model, and/or other device characteristic of the deliverables connected client device 112 (e.g., the operating system). In some embodiments, user approval (e.g., via a user approval indicator) must be received before the client device connectivity application may be accessed to communicate particular data (e.g., enhanced external display data) between the enhanced delivering radio processor 102 and the deliverables connected client device 112.

In some embodiments, the user of the deliverables connected client device 112 "opts in" to receiving electronic deliverables as described herein. The deliverables connected client device 112 may be utilized to configure itself and/or an associated enhanced delivering radio processor, such as the enhanced delivering radio processor 102, to process particular data as described herein for providing one or more electronic deliverable(s). For example, in some embodiments, the user installs and/or otherwise executes a user-facing application via the deliverables connected client device, and provides user authentication and/or permissions data (e.g., associated with a user account) utilizing the user-facing application that indicates the user would like to receive electronic deliverables. In some embodiments, the user-facing application provides functionality and/or data based at least in part on information and/or communications with a central server, such as the electronic deliverables management system 114 and/or an associated system. In one example context, the electronic deliverables management system 114 and/or an associated system maintains the authentication and/or permission data for user account(s) that have opted into receiving electronic deliverable(s). In some embodiments, the user-facing application embodies a native "app" or browser-accessed web application that provides the functionality described herein.

The optional electronic deliverables management system 114 is embodied in hardware, software, firmware, and/or a combination thereof, that provides data management and/or tracking associated with electronic deliverables. In some embodiments, such functionality includes generation and/or receiving of electronic deliverables, enhanced external display data associated therewith, electronic code(s) associated therewith, and/or the like. The electronic deliverables management system 114 may store and/or otherwise maintain such generated data for providing to radio transmission system(s) 106 and/or the like. For example, in some embodiments the electronic deliverables management system 114 includes display data associated with a particular electronic deliverable, electronic code(s) associated with an electronic deliverable, web locator(s) associated with an electronic deliverable, and/or the like, that may be utilized by the radio transmission system 106 for performing the data transmission and tracking functionality described herein. Additionally or alternatively, in some embodiments, such functionality includes tracking and/or maintaining of access data indicative of access by a user profile or a particular deliverables connected client device of any data associated with each particular electronic deliverable. In this regard, the electronic deliverables management system 114 may provide functionality for identifying what user profile(s) and/or deliverables connected client device(s) have accessed data associated with a particular electronic deliverable.

In some embodiments, the electronic deliverables management system 114 may be embodied via any number of server(s) that provide such functionality. In some embodiments, for example, the electronic deliverables management system 114 includes one or more specially configured application server(s) that provide access to processing functionality (e.g., for data generation, transmission and provision, or other processing). Additionally or alternatively, in some embodiments for example, the electronic deliverables management system 114 includes one or more specially configured database server(s) that provide data storage and/or maintenance functionality (e.g., management of data associated with electronic deliverables, tracking of access data corresponding to access of electronic deliverables, and/or the like). It should be appreciated that the electronic deliverables management system 114 may be embodied by a single specially configured computing device, multiple local computing devices functioning in tandem with one another, multiple remote computing devices functioning in tandem with one another over one or more communication network(s), and/or a combination of local and remote computing devices functioning in tandem with one another over one or more communication network(s) to provide the functionality as described herein.

The communications network 118 enables communication between the deliverables connected client device 112 and the enhanced delivering radio processor 102. In some embodiments, the communications network 118 is embodied, in whole or in part, by one or more physical connections between the enhanced delivering radio processor 102 and the deliverables connected client device 112. For example, in some embodiments the communications network 118 is embodied by a direct, wired connection between the enhanced delivering radio processor 102 and the deliverables connected client device 112. The direct, wired connection may be embodied utilizing any of a myriad of wired data communication protocols, such as USB 2.0, USB 3.0, USB-C, micro USB, mini USB, Lightning, HDMI and/or the like. Alternatively or additionally, in some embodiments, the communications network 118 is embodied by a wireless connection for communicating between the enhanced delivering radio processor 102 and the deliverables connected client device 112. The wireless connection may be embodied utilizing any of a myriad of short- and/or medium-range communication protocols, such as Bluetooth, near-field communications, ZigBee, Z-Wave, and/or the like.

The radio transmission system 106 includes one or more computing device(s) embodied in hardware, software, firmware, and/or a combination thereof, that provides enhanced signal wave generation and transmission functionality, and/ or functionality for controlling an associated enhanced delivery radio transmitter, such as the enhanced delivery radio transmitter 108. Such functionality includes generation of data for transmission, determination of particular data for transmission, and/or transmission of identified data via the enhanced delivery radio transmitter 108. In some embodiments, the radio transmission system 106 encodes, modulates, and/or otherwise alters one or more portions of digital data to be transmitted. Additionally or alternatively, in some embodiments, the radio transmission system 106 activates the enhanced delivery radio transmitter 108 to cause the enhanced delivery radio transmitter 108 to emit, output, and/or otherwise generate one or more enhanced radio signal wave(s) representing such data for transmission. The radio transmission system 106 may activate the enhanced delivery radio transmitter 108 to cause emission of enhanced radio signal waves corresponding to a defined target geographic area, such that target devices within the defined geographic area are expected to be able to detect, receive, and/or otherwise capture the transmitted enhanced radio signal wave. In one example context, the radio transmission system 106 is embodied by computing system(s) associated with operation of a radio station. It should be appreciated that, in other embodiments, an alternative signal transmissions system similar to the radio transmission system 106 may transmit alterative types of enhanced signal waves (e.g., utilizing alternative hardware and/or protocols) in a similar manner without deviating from the scope and spirit of this disclosure.

FIG. 2 illustrates a block diagram of an example signal processor apparatus that may be specially configured in accordance with an example embodiment of the present disclosure. In some embodiments, the enhanced delivering radio processor 102 is embodied by one or more computing systems, such as the signal processing apparatus 200 as depicted and described in FIG. 2. The signal processing apparatus 200 includes processor 202, memory 204, input/ output circuitry 206, communications circuitry 208, and signal receiver circuitry 210. The signal processing apparatus 200 may be configured, using one or more of the sets of circuitry 202, 204, 206, 208, and/or 210, to execute the operations described herein.

Although components are described with respect to functional limitations, it should be understood that the particular implementations necessarily include the user of particular computing hardware. It should also be understood that certain of the components described herein may include similar or common hardware. For example, two sets of circuitry may both leverage use of the same processor(s), network interface(s), storage medium(s), and/or the like, to perform their associated functions, such that duplicate hardware is not required for each set of circuitry. The user of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the signal processing apparatus 200 may provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) may be in communication with the memory 204 via a bus for passing information among components of the signal processing apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 304 is configured to store information, data, content, applications, instructions, or the like, for enabling the signal processing apparatus 200 to carry out various functions in accordance with example embodiments of the present disclosure.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the signal processing apparatus 200, and/or one or more remote or "cloud" processor(s) external to the signal processing apparatus 200.

In an example embodiment, the processor 202 may be configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions may specifically configure the processor 202 to perform the algorithms embodied in the specific operations described herein when such instructions are executed.

As one particular example, the processor 202 may be configured to perform various operations associated with wireless signal processing for external display, for example as described with respect to operation of the enhanced delivering radio processor 102 and/or as described further herein. In some embodiments, the processor 202 includes hardware, software, firmware, and/or a combination thereof, that receives transmission signals, and/or captures transmitted enhanced signal waves representing transmission signals, including at least enhanced external display data. Additionally or alternatively, in some embodiments, the processor 202 includes hardware, software, firmware, and/or a combination thereof, that transmits enhanced external display data to a deliverables connected client device to cause rendering of a deliverables display interface associated therewith.

In some embodiments, the signal processing apparatus 200 includes input/output circuitry 206 that may, in turn, be in communication with processor 202 to provide output to the user and, in some embodiments, to receive an indication of a user input. The input/output circuitry 206 may comprise one or more user interface(s) and may include a display that may comprise the interface(s) rendered as a web user interface, an application user interface, a user device, a backend system, or the like. In some embodiments, the input/output circuitry 206 may also include a keyboard, a mouse, a joystick, a touch screen, touch areas, soft keys a microphone, a speaker, or other input/output mechanisms. The processor 202 and/or input/output circuitry 206 comprising the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user.

The communications circuitry 208 may be any means such as a device or circuitry embodied in either hardware or a combination of hardware and software that is configured to receive and/or transmit data from/to a network and/or any other device, circuitry, or module in communication with the signal processing apparatus 200. In this regard, the communications circuitry 308 may include, for example, a network interface for enabling communications with a wired or wireless communication network. For example, the communications circuitry 208 may include one or more network interface card(s), antenna(s), bus(es), switch(es), router(s), modem(s), and supporting hardware, firmware, and/or software, or any other device suitable for enabling communications via one or more communication network(s). Additionally or alternatively, the communications circuitry 208 may include circuitry for interacting with the antenna(s) and/or other hardware or software to cause transmission of signals via the antenna(s) or to handle receipt of signals received via the antenna(s). In some embodiments, the communications circuitry 208 enables transmission to and/or receipt of data from a client device in communication with the signal processing apparatus 200.

Additionally or alternatively, in some embodiments, the signal processing apparatus 200 optionally includes signal receiver circuitry 210. The signal receiver circuitry 210 includes hardware, software, firmware, and/or a combination thereof, that supports various enhanced signal wave detection and/or processing functionality. For example, in some embodiments, the signal receiver circuitry 210 includes hardware, software, firmware, and/or a combination thereof, that captures wirelessly transmitted enhanced signal waves over a particular frequency range. Additionally or alternatively, in some embodiments, the signal receiver circuitry 210 includes hardware, software, firmware, and/or a combination thereof, that processes captured transmissions enhanced signal waves to generate corresponding digital and/or analog signals (e.g., transmission signals embodied as digital signals representing the enhanced signal waves). Additionally or alternatively, in some embodiments, the signal receiver circuitry 210 includes hardware, software, firmware, and/or a combination thereof, that routes and/or otherwise transmits the generated transmission signals (e.g., digital transmission signals) for further processing. In some embodiments, signal receiver circuitry 210 may include a separate processor, specially configured field programmable gate array (FPGA), or a specially programmed application specific integrated circuit (ASIC). In yet some other embodiments, the signal receiver circuitry 210 is embodied by an external signal receiver (e.g., one or more specially configured antenna(s)) communicable with the signal processing apparatus 200, for example via the communications circuitry 208.

Additionally or alternative still, in some embodiments, the signal processing apparatus 200 includes signal processing circuitry 212. The signal processing circuitry 212 includes hardware, software, firmware, and/or a combination thereof, that supports various transmission signal processing functionality. For example, in some embodiments, the signal processing circuitry 212 includes hardware, software, firmware, and/or a combination thereof, that receives transmissions signal(s), for example enhanced radio transmission signals, associated with received enhanced signal wave(s). Additionally or alternatively, in some embodiments, the signal processing circuitry 212 includes hardware, software, firmware, and/or a combination thereof, that extracts at least enhanced external display data from a transmission signal. Additionally or alternatively still, in some embodiments, the signal processing circuitry 212 includes hardware, software, firmware, and/or a combination thereof, that forwards enhanced external display data to a deliverables connected client device (or multiple deliverables connected client devices) to cause rendering of a deliverables display interface based at least in part on the enhanced external display data. Additionally or alternatively still, in some embodiments, the signal processing circuitry 212 includes hardware, software, firmware, and/or a combination thereof, that validates location data object(s) associated with one or more deliverables connected client device(s). Additionally or alternatively still, in some embodiments, the signal processing circuitry 212 includes hardware, software, firmware, and/or a combination thereof, that receives and stores access data associated with enhanced external display data. Additionally or alternatively still, in some embodiments, the signal processing circuitry 212 includes hardware, software, firmware, and/or a combination thereof, that enabling communication with deliverables connected client device(s) in response to connection approval indicator(s). In some embodiments, signal receiver circuitry 210 may include a separate processor, specially configured field programmable gate array (FPGA), or a specially programmed application specific integrated circuit (ASIC).

In some embodiments, one or more of the sets of circuitries 202-212 are combinable. Alternatively or additionally, in some embodiments, one or more of the sets of circuitry perform some or all of the functionality described associated with another component. For example, in some embodiments, one or more of the sets of circuitry 202-212 are combined into a single module embodied in hardware, software, firmware, and/or a combination thereof. Similarly, in some embodiments, one or more of the sets of circuitry, for example signal receiver circuitry 210 and/or signal processing circuitry 212 is combined with the processor 202 such that the processor 202 performs one or more of the operations described above with respect to each of these modules.

FIG. 3 illustrates a block diagram of an example client device apparatus that may be specially configured in accordance with an example embodiment of the present disclosure. In some embodiments, the deliverables connected client device 112 is embodied by one or more computing systems, such as the client device apparatus 300 as depicted and described in FIG. 3. The client device apparatus 300 includes a processor 302, a memory 304, input/output circuitry 306, communications circuitry 308, data receiver circuitry 310, and/or external data processing circuitry 312. The client device apparatus 300 may be configured using one or more of the sets of circuitry to execute the operations described herein. The circuitry 302-312 may function similarly or identically to the similarly-named sets of circuitry depicted and described with respect to the signal processing apparatus 200. For purposes of brevity, repeated disclosure with regard to the functionality of such similarly-named sets of circuitry is omitted herein.

Data receiver circuitry 310 includes hardware, software, firmware, and/or a combination thereof, that supports functionality associated with intake of enhanced external display data and/or additional data for processing. In this regard, in some embodiments, the data receiver circuitry 310 includes hardware, software, firmware, and/or a combination thereof, to receive transmitted enhanced external display data from a signal processor (e.g., an enhanced delivering radio processor embodied by the signal processing apparatus 200). Additionally or alternatively, in some embodiments, the data receiver circuitry 310 includes hardware, software, firmware, and/or a combination thereof, to establish and/or maintain a connection with a signal processor. Additionally or alternatively, in some embodiments, the data receiver circuitry 310 includes hardware, software, firmware, and/or a combination thereof, to receive input embodying a connection approval indicator associated with a particular signal processor, and/or stores the connection approval indicator. In some embodiments, data receiver circuitry 310 may include a separate processor, specially configured field programmable gate array (FPGA), or a specially programmed application specific integrated circuit (ASIC).

External data processing circuitry 312 includes hardware, software, firmware, and/or a combination thereof, that supports client device enhanced external display data processing functionality. In this regard, in some embodiments, the external data processing circuitry 312 includes hardware, software, firmware, and/or a combination thereof, to generate a deliverables display interface based at least in part on enhanced external display data. Additionally or alternatively, in some embodiments, the external data processing circuitry 312 includes hardware, software, firmware, and/or a combination thereof, to implement one or more process(es) for accessing particular data resources based at least in part on enhanced external display data. Additionally or alternatively still, in some embodiments, the external data processing circuitry 312 includes hardware, software, firmware, and/or a combination thereof, to receive input accessing a deliverables display interface, accessing data associated with the deliverables display interface in response to such input, and/or transmitting data indicative of access of a deliverables display interface. In some embodiments, external data processing circuitry 312 may include a separate processor, specially configured field programmable gate array (FPGA), or a specially programmed application specific integrated circuit (ASIC).

In some embodiments, one or more of the sets of circuitries 302-312 are combinable. Alternatively or additionally, in some embodiments, one or more of the sets of circuitry perform some or all of the functionality described associated with another component. For example, in some embodiments, one or more of the sets of circuitry 302-312 are combined into a single module embodied in hardware, software, firmware, and/or a combination thereof. Similarly, in some embodiments, one or more of the sets of circuitry, for example data receiver circuitry 310 and/or external data processing circuitry 312 is combined with the processor 302 such that the processor 302 performs one or more of the operations described above with respect to each of these modules.

FIG. 4 illustrates a block diagram of an example signal transmission apparatus that may be specially configured in accordance with an example embodiment of the present disclosure. In some embodiments, the radio transmission system 106 is embodied by one or more computing systems, such as the signal transmission apparatus 400 as depicted and described in FIG. 4. The signal transmission apparatus 400 includes a processor 402, a memory 404, input/output circuitry 406, communications circuitry 408, signal transmission circuitry 410, and/or signal generation circuitry 412. The signal transmission apparatus 400 may be configured using one or more of the sets of circuitry to execute the operations described herein. The circuitry 402-412 may function similarly or identically to the similarly-named sets of circuitry depicted and described with respect to the signal processing apparatus 200. For purposes of brevity, repeated disclosure with regard to the functionality of such similarly-named sets of circuitry is omitted herein.

In some embodiments, signal transmission apparatus 400 optionally includes signal transmission circuitry 410. Signal transmission circuitry 410 includes hardware, software, firmware, and/or a combination thereof, that supports functionality associated with transmitting wireless enhanced signal waves. In this regard, in some embodiments, the signal transmission circuitry 410 includes hardware, software, firmware, and/or a combination thereof, to identify data for wireless transmission. Additionally or alternatively, in some embodiments, the signal transmission circuitry 410 includes hardware, software, firmware, and/or a combination thereof, to activate one or more transmitter(s) to wirelessly output transmission enhanced signal wave(s) representing particular data. In some embodiments, for example, signal transmission circuitry 410 includes hardware, software, firmware, and/or a combination thereof, to transmit enhanced radio signal wave(s) representing particular data to be wirelessly transmitted. In some embodiments, signal transmission circuitry 410 may include a separate processor, specially configured field programmable gate array (FPGA), or a specially programmed application specific integrated circuit (ASIC).

Signal generation circuitry 412 includes hardware, software, firmware, and/or a combination thereof, that supports data functionality for generation of data to be wirelessly transmitted. In this regard, in some embodiments, the signal generation circuitry 412 includes hardware, software, firmware, and/or a combination thereof, to receive inputted data for transmission via wireless enhanced signal wave(s). For example, the inputted data may include user inputted data via one or more interfaces, captured data (e.g., audio data) via one or more peripheral device(s), and/or the like. Alternatively or additionally, in some embodiments, the signal generation circuitry 412 includes hardware, software, firmware, and/or a combination thereof, to identify stored data for transmitting as wireless transmission enhanced signal wave(s). For example, the stored data may include previously received and/or otherwise stored audio data and/or related information for transmission via wireless enhanced signal waves. Additionally or alternatively, in some embodiments, the signal generation circuitry 412 includes hardware, software, firmware, and/or a combination thereof, to generate data for transmission via wireless enhanced signal wave(s). For example, in some embodiments, the data is generated by particular process(es) performed by the signal generation circuitry 412. In some embodiments, signal generation circuitry 412 may include a separate processor, specially configured field programmable gate array (FPGA), or a specially programmed application specific integrated circuit (ASIC).

In some embodiments, one or more of the sets of circuitries 402-412 are combinable. Alternatively or additionally, in some embodiments, one or more of the sets of circuitry perform some or all of the functionality described associated with another component. For example, in some embodiments, one or more of the sets of circuitry 402-412 are combined into a single module embodied in hardware, software, firmware, and/or a combination thereof. Similarly, in some embodiments, one or more of the sets of circuitry, for example signal transmission circuitry 410 and/or signal generation circuitry 412 is combined with the processor 402 such that the processor 402 performs one or more of the operations described above with respect to each of these modules.

FIG. 5 illustrates a block diagram of an example electronic deliverables management apparatus that may be specially configured in accordance with an example embodiment of the present disclosure. In some embodiments, the electronic deliverables management system 114 is embodied by one or more computing systems, such as the electronic deliverables management apparatus 500 as depicted and described in FIG. 5. The electronic deliverables management apparatus 500 includes a processor 502, a memory 504, input/output circuitry 506, communications circuitry 508, electronic deliverable storage circuitry 510, and/or access tracking circuitry 512. The electronic deliverables management apparatus 500 may be configured using one or more of the sets of circuitry to execute the operations described herein. The circuitry 502-512 may function similarly or identically to the similarly-named sets of circuitry depicted and described with respect to the signal processing apparatus 200. For purposes of brevity, repeated disclosure with regard to the functionality of such similarly-named sets of circuitry is omitted herein.

Electronic deliverable storage circuitry 510 includes hardware, software, firmware, and/or a combination thereof, that supports electronic deliverables data maintenance. In this regard, in some embodiments, the electronic deliverable storage circuitry 510 includes hardware, software, firmware, and/or a combination thereof, to store one or more previously generated electronic deliverable data object(s) and/or data associated therewith (e.g., enhanced external display data). Additionally or alternatively, in some embodiments, the electronic deliverable storage circuitry 510 includes hardware, software, firmware, and/or a combination thereof, to generate an electronic deliverable data object, for example in response to received data, input, and/or the like. Additionally or alternatively, in some embodiments, the electronic deliverable storage circuitry 510 includes hardware, software, firmware, and/or a combination thereof, to receive and store electronic deliverable data object(s) from external data system(s) (e.g., third-party provider systems associated with such electronic deliverable data object(s)). In some embodiments, electronic deliverable storage circuitry 510 may include a separate processor, specially configured field programmable gate array (FPGA), or a specially programmed application specific integrated circuit (ASIC).

Access tracking circuitry 512 includes hardware, software, firmware, and/or a combination thereof, that support functionality for tracking access associated with electronic deliverable data object(s). In this regard, in some embodiments, the access tracking circuitry 512 includes hardware, software, firmware, and/or a combination thereof, to receive access data associated with enhanced external display data corresponding to an electronic deliverable data object. Additionally or alternatively, in some embodiments, the access tracking circuitry 512 includes hardware, software, firmware, and/or a combination thereof, to store at least a portion of access data associated with the enhanced external display data and/or electronic deliverable data object associated therewith. Additionally or alternatively, in some embodiments, the access tracking circuitry 512 includes hardware, software, firmware, and/or a combination thereof, to retrieve stored access data for processing and/or transmission. Additionally or alternatively, in some embodiments, the access tracking circuitry 512 includes hardware, software, firmware, and/or a combination thereof, to process retrieved and/or received access data to perform one or more determinations. For example, in some embodiments, the access tracking circuitry 512 is configured to determine particular similarities between characteristics of client device(s) and/or user profile(s) associated therewith that are most likely (and/or most unlikely) to access a particular electronic deliverable data object. Such similarities may include similarities in device types, similarities in connection types with the enhanced delivering radio processor, similarities in locations of the devices, similarity in biographical characteristics of the user profile associated with such client devices, and/or the like. In some embodiments, access tracking circuitry 512 may include a separate processor, specially configured field programmable gate array (FPGA), or a specially programmed application specific integrated circuit (ASIC).

In some embodiments, one or more of the sets of circuitries 502-512 are combinable. Alternatively or additionally, in some embodiments, one or more of the sets of circuitry perform some or all of the functionality described associated with another component. For example, in some embodiments, one or more of the sets of circuitry 502-512 are combined into a single module embodied in hardware, software, firmware, and/or a combination thereof. Similarly, in some embodiments, one or more of the sets of circuitry, for example electronic deliverable storage circuitry 510 and/or access tracking circuitry 512 is combined with the processor 502 such that the processor 502 performs one or more of the operations described above with respect to each of these modules.

Example Data Flows of the Disclosure

Having described example systems and apparatuses in accordance with the present disclosure, example visualizations of data flow between systems, devices, and/or apparatuses of the present disclosure will now be discussed. The depicted data flows represent specific example data flows for processing and/or tracking of wirelessly transmitted signals via the various systems, devices, and/or apparatuses of the disclosure. It will be appreciated that, in other embodiments, such data flows may differ without deviating from the scope and spirit of this disclosure. For example, in some embodiments, data may pass through one or more additional and/or alternative intermediary devices that performs one or more process(es) based at least in part on the data, transforms the incoming data for further processing, and/or the like.

FIG. 6 illustrates a visualization representing data flow for outputting based on enhanced radio transmission signal(s) in accordance with some example embodiments of the present disclosure. Specifically, FIG. 6 illustrates data flow between a radio receiver 604, an enhanced delivering radio processor 608, an audio output 612, and a deliverables connected client device 618. The specific data flow is described with respect to processing of radio signals as an example. In other embodiments, other types, frequencies, and/or representations of wirelessly transmitted signals may similarly be processed.

In the depicted data flow, the radio receiver 604 captures, detects, and/or otherwise receives enhanced radio signal waves 602. The enhanced radio signal waves 602 embody wirelessly transmitted signals representing content to be processed and/or output via one or more receiving enhanced delivering radio processor(s). In one example context, a radio station may transmit the enhanced radio signal waves 602 within a particular area so that a particular listenership within that area may utilize their enhanced delivering radio processor(s) to capture and output data based on such enhanced radio signal waves 602. The enhanced radio signal waves 602 may include music, advertising content, live broadcast audio (e.g., real-time recorded interview audio), and/or the like. The radio receiver 604 may capture the enhanced radio signal waves 602 as the electromagnetic wave embodying the enhanced radio signal waves 602 reach, interact with, and/or otherwise pass over the radio receiver 604. In this regard, a direct connection and/or a wired connection is not necessary between the radio receiver 604 and the transmitting source (e.g., a radio transmission system as depicted and described herein).

The enhanced radio signal waves 602 may include one or more data portions, each represented by any number of independent data properties and corresponding data values. For example, in some embodiments, the enhanced radio signal waves 602 embodies at least a first data portion representing radio transmission content and a second data portion representing additional data associated with such radio transmission content. The radio transmission content may include audio and/or visual data to be output, for example for listening by a user. In the example context of a radio station transmission, for example, such radio transmission content may include audio data representing a song, a radio host's voice, an audio advertisement, and/or the like. The additional data associated with such radio transmission content may include any of a myriad of audio data and/or visual data that supplements or otherwise is associated with the radio transmission content.

In some embodiments, the additional data embodied by an enhanced radio signal wave, such as the enhanced radio signal waves 602, further includes various sub-portions. For example, in some embodiments, the additional data includes first data to be output via particular output components of the enhanced delivering radio processor 608. This first data may include additional audio data, additional visual data to be output via a display during output of the corresponding audio data (e.g., song title information, artist information, station information, and/or the like), or other information processable to produce one or more determinations and/or outputs. Additionally or alternatively, in some embodiments, the additional data of the enhanced radio signal waves 602 includes data representing enhanced external display data to be processed via a device separate from the enhanced delivering radio processor itself. For example, the additional data may embody or be usable to generate an enhanced user interface and/or user experience to be output via a deliverables connected client device separate but communicable with the receiving enhanced delivering radio processor.

The radio receiver 604 captures the enhanced radio signal waves 602 and generates enhanced radio transmission signal 606. The enhanced radio transmission signal 606 embodies a digital representation of the enhanced radio signal waves 602. In this regard, the radio receiver 604 forwards and/or otherwise transmits the enhanced radio transmission signal 606 to the enhanced delivering radio processor 608. In some embodiments, the radio receiver 604 demodulates, parses, decodes, and/or otherwise processes the enhanced radio signal waves 602 to generate the corresponding enhanced radio transmission signal 606 representing said enhanced radio signal waves 602. The enhanced radio transmission signal 606 may be generated including the same sub-portions represented by the enhanced radio signal waves 602. For example, in one example context, the enhanced radio transmission signal 606 is generated including at least radio transmission content 610 and additional content comprising enhanced external display data 616 embodied in a manner that is further processable via the enhanced delivering radio processor 608. The enhanced delivering radio processor 608 then receives the enhanced radio transmission signal 606 generated and/or forwarded from the radio receiver 604.

The enhanced delivering radio processor 608 processes the enhanced radio transmission signal 606 to perform determination(s) and/or initiate output of the data embodied by the enhanced radio transmission signal 606. In some embodiments, the enhanced delivering radio processor 608 parses the enhanced radio transmission signal 606 to identify one or more data portions embodied therein. For example, in some embodiments, the enhanced delivering radio processor identifies and extracts each portion of data represented within the enhanced radio transmission signal (e.g., radio transmission content, first additional data embodying supplemental content for outputting via the enhanced delivering radio processor or an on-device output, second additional data embodying supplemental content for outputting via a deliverables connected client device, and/or the like). In some embodiments, the enhanced delivering radio processor 608 utilizes a particular determinable protocol for processing the enhanced radio transmission signal 606. For example, the enhanced delivering radio processor 608 may be configured to utilize a predetermined protocol that standardizes how to identify, parse, and/or extract distinct portions of data from the enhanced radio transmission signal 606.

As illustrated, for example, the enhanced delivering radio processor 608 parses and/or extracts two portions of data from the enhanced radio transmission signal 606 specifically radio transmission content 610 and enhanced external display data 616. The enhanced delivering radio processor 608 may determine, for example from one or more data indicators represented in the enhanced radio transmission signal 606, which portion of data embodies the radio transmission content 610 and which portion of data represents the enhanced external display data 616. Additionally or alternatively, in some embodiments, the enhanced delivering radio processor 608 determines based on one or more data indicators that the radio transmission content 610 is to be outputted via one or more on-device outputs (e.g., one or more speakers, displays, infotainment systems, and/or other output components that share a housing and are communicatively coupled with the enhanced delivering radio processor 608), and determines based on one or more data indicators that the enhanced external display data 616 is to be outputted via an off-device output, such as a deliverables connected client device in circumstances where one is connected and/or otherwise accessible.

In some embodiments, the enhanced external display data 616 includes audio/visual data to be outputted via a deliverables connected client device (e.g., an image element or a user interface). Alternatively or additionally, in some embodiments, the enhanced external display data 616 includes resource identifier data (e.g., a web URL) utilized to retrieve the audio/visual data for outputting via the deliverables connected client device. For example, the deliverables connected client device 618 may receive such resource identifier data and process such data to retrieve the relevant user interface(s) for outputting corresponding to the radio transmission content 610. Alternatively or additionally, in some embodiments, the enhanced external display data 616 includes a unique tracking identifier utilizable by the entity that created and/or caused transmission of the enhanced external display data (e.g., a provider advertising via the radio transmission). In some embodiments, the unique tracking identifier is accessed by the deliverables connected client device 618 to provide access data indicating the particular transmission associated with a particular electronic deliverable was received and/or accessed, as described herein. Alternatively or additionally, in some embodiments, the unique tracking identifier is retrieved (e.g., automatically via electronic communication or manually via a user interface) at the time a transaction is performed, for example utilizing a transaction initiated utilizing a redeemable deliverable code provided via the enhanced external display data 616.

The enhanced delivering radio processor 608 forwards and/or otherwise transmits the radio transmission content 610 to the audio output 612 for outputting. In some embodiments, the audio output 612 includes or is embodied by a speaker, headphone, or other audio producing device communicatively coupled with the enhanced delivering radio processor 608. Alternatively or additionally, in some embodiments, the audio output 612 is embodied by a speaker of an infotainment system that further includes the enhanced delivering radio processor 608. The enhanced delivering radio processor 608 may activate the audio output to cause the audio output to product particular output corresponding to the radio transmission content 610. For example, as illustrated, the audio output 612 produces the content output 614. The content output 614 embodies audio represented by the radio transmission content 610. For example, in one example context, the content output 614 embodies audio embodying an advertisement transmitted as part of a particular radio broadcast.

The enhanced delivering radio processor 608 may forward the enhanced external display data 616 to the deliverables connected client device 618 via a particular communications network that is established between the deliverables connected client device 618 with the enhanced delivering radio processor 608. For example, the enhanced delivering radio processor 608 may transmit the enhanced external display data 616 to the deliverables connected client device via a wired connection or a short-range wireless connection that communicatively couples the enhanced delivering radio processor 608 and the deliverables connected client device 618. In some embodiments, the deliverables connected client device 618 is embodied by a user device associated with a particular user accessing the apparatus embodying or including the enhanced delivering radio processor 608, audio output 612, and/or the like. Additionally or alternatively, in some embodiments, the deliverables connected client device 618 accesses and/or executes one or more specially configured software application(s) (e.g., a native application and/or a browser application installed to or otherwise executable via the deliverables connected client device 618) that is configured to process the enhanced external display data 616.

In some embodiments, the enhanced delivering radio processor 608 forwards the enhanced external display data 616 to cause the deliverables connected client device 618 to generate and/or output the user interface 620. In this regard, the enhanced external display data 616 may include various data utilized to configure, generate, and/or otherwise output the user interface 620. For example, in some embodiments, the enhanced external display data 616 includes a redeemable deliverable code associated with a particular electronic deliverable represented by the enhanced external display data 616. In some embodiments, the deliverables connected client device 618 is caused to generate the user interface 620 with predetermined interface elements and including at least the redeemable deliverable code and/or data associated therewith. Alternatively or additionally, in some embodiments, the enhanced external display data 616 includes a web resource locator associated with a particular electronic deliverable represented by the enhanced external display data 616. In some embodiments, the deliverables connected client device 618 is caused to automatically access the web resource locator to display the user interface 620 including interface elements of the web resource retrievable via the web resource locator. Additionally or alternatively, in some embodiments, the enhanced external display data 616 includes audio data and/or visual data for outputting as part of the user interface 620. For example, in some embodiments, the enhanced external display data 616 includes visual data embodying one or more background images, text elements, and/or other interface elements of the user interface 620.

In some embodiments, the enhanced delivering radio processor 608 causes output of the user interface 620 via the deliverables connected client device 618 simultaneously, or near simultaneously (e.g., immediately before or after), with the content output 614 outputted by the audio output 612. In this regard, the enhanced delivering radio processor 608 is specially configured to enable parity between the context and content of the content output 614 and the user interface 620. For example, as new enhanced radio signal waves 602 are received representing new content is received (e.g., a newly beginning song, a newly beginning advertisement, and/or the like), the enhanced delivering radio processor 608 may cause output of the content output 614 representing primary audio/visual content of the new content and simultaneously cause output of the user interface 620 representing additional audio/visual content associated with the new content. In the context of advertisement data, for example, the specially configured enhanced delivering radio processor 608 may cause outputting of the content output 614 embodying the advertisement content simultaneously with a user interface 620 that embodies a redeemable electronic deliverable corresponding to said advertisement. For example, an advertisement may be broadcast that corresponds to a particular entity (e.g., a merchant) "Provider A" represents a restaurant. The advertisement may correspond to content output 614 that embodies audio of the advertisement inviting listeners to come to the restaurant, and simultaneously (or near-simultaneously) the user interface 620 may be outputted via the deliverables connected client device 618 including an interface with a redeemable electronic deliverable (e.g., a promotional code), a link or web page for redeeming the redeemable electronic deliverable, and/or the like. As a subsequent advertisement is broadcast, the corresponding audio data and user interface may be updated in real-time to reflect data corresponding to the updated advertisement.

FIG. 7 illustrates a visualization representing data flow for tracking of data associated with transmitted enhanced signal waves in accordance with at least some example embodiments of the present disclosure. Specifically, FIG. 7 illustrates data flow between deliverables connected client device 618 and electronic deliverables management system 706. The data flow may be performed as an addition and/or sub-process during outputting data based on enhanced radio transmission signal(s), for example additional to the data flow described with respect to FIG. 6.

As depicted and described, the user interface 620 may be outputted and/or otherwise made available via the deliverables connected client device 618. In some example embodiments, the user interface 620 is associated with a particular electronic deliverable data object, for example a promotion, code, digital experience, and/or other information corresponding to primary content data. The deliverables connected client device 618 may continue to maintain and/or output the user interface 620 until one or more particular triggers or events is detected. For example, in some embodiments, the user interface 620 is maintained until the user interface 620 is accessed, until the user interface 620 is closed or output is otherwise terminated, and/or until a new user interface (e.g., associated with a different electronic deliverable data object) is to be outputted.

The user interface 620 may be accessed in one or more manners. In some embodiments, for example, user input is received from a user 702 that accesses at least a portion of the user interface 620. The access of the user interface 620 may comprise a user interaction performed by user 702 with a particular interface element of the user interface 620, such as accessing a particular resource locator rendered within the user interface 620, interacting with a confirmation or acknowledgement button indicating the user 702 has seen or would like to obtain the redeemable electronic deliverable, and/or the like. Alternatively or additionally, the deliverables connected client device 618 accesses the user interface 620 automatically (e.g., in response to previously defined settings by the user 702). Upon detecting access of the user interface 620, the deliverables connected client device 618 may update the user interface 620 (e.g., to display additional data associated with the redeemable electronic deliverable, to access a particular web resource, and/or the like).

Upon detecting access of the user interface 620, whether by the user 702 or automatically, the deliverables connected client device 618 generates access data 704 and/or transmits access data 704 to the electronic deliverables management system 706. The access data 704 indicates that the user interface 620 associated with the redeemable electronic deliverable data object has been accessed via the deliverables connected client device 618. In some embodiments, the access data 704 includes data associated with and/or otherwise identifying the deliverables connected client device 618 (e.g., device model, device make, device identifier, IP address, IMI, and/or the like). Alternatively or additionally, in some embodiments, the access data 704 includes data associated with and/or otherwise identifying a user profile corresponding to the user 702 (e.g., a user profile identifier, a device identifier, biographical information associated with the user 702, location data, and/or the like). Alternatively or additionally, in some embodiments, the access data 704 includes contextual and/or circumstantial data associated with access of the user interface 620 via the deliverables connected client device 618. For example, the access data 704 may include location data indicating the location of the deliverables connected client device 618 at the time that the user interface 620 was accessed. Alternatively or additionally, the access data 704 may include timestamp data that indicates the datetime at which the user interface 620 was accessed.

Alternatively or additionally still, in some embodiments, the access data 704 includes data identifying and/or associated with the user interface 620 that was accessed, the enhanced external display data associated therewith, and/or the redeemable electronic deliverable data object associated therewith. For example, in some embodiments, the access data 704 includes a data identifier that uniquely identifies the redeemable electronic deliverable data object associated with the user interface 620. Alternatively or additionally still, in some embodiments, the access data 704 includes the enhanced external display data utilized to render the user interface 620, or at least a portion thereof. For example, in some embodiments, the access data 704 includes at least a redeemable deliverable code associated with the electronic deliverable corresponding to the user interface 620, and/or a web resource locator associated with the electronic deliverable corresponding to the user interface 620. In this regard, the access data 704 may include various data usable for associating the access data 704 with a particular electronic deliverable, and/or associating user information with the particular electronic deliverable.

The electronic deliverables management system 706 receives the access data 704 from the deliverables connected client device 618 in response to the access of the user interface 720. In some embodiments, the electronic deliverables management system 706 stores some or all of the access data 704. For example, in some embodiments, the electronic deliverables management system 706 stores data identifying the deliverables connected client device 618 and/or properties thereof, and/or stores data identifying the user profile corresponding to the user 702 and/or characteristics thereof. Alternatively or additionally, in some embodiments, the electronic deliverables management system 706 performs one or more process(es) based on the received access data 704. For example, in some embodiments, the electronic deliverables management system 706 updates data values indicating a number of accesses associated with a particular electronic deliverable, data values indicating the biographical properties associated with users that access data associated with a particular electronic deliverable, data values indicating the device properties associated with deliverables connected client devices utilized to access data associated with a particular electronic deliverable, data values indicating the most likely days, times, or other datetime information when access of a data corresponding to a particular electronic deliverable occurs, a geographic area within which data corresponding to a particular electronic deliverable has been accessed and/or is most likely accessed.

In this regard, the electronic deliverables management system 706 may utilize the access data received from various deliverables connected client devices, such as the access data 704 received from the deliverables connected client device 618, to track access associated with one or more electronic deliverable(s). As access data is received for various electronic deliverables, deliverables connected client devices, and/or user profiles, the electronic deliverables management system 706 may update and maintain data to track such received data. Additionally or alternatively, in some embodiments, the electronic deliverables management system 706 processes stored data associated with one or more electronic deliverables to perform various determinations associated with such electronic deliverables and/or initiate one or more action(s) based on the stored data. For example, in some embodiments, the electronic deliverables management system 706 processes stored data to determine biographical information, device information, and/or other characteristics associated with users and/or devices that most likely access data associated with a particular electronic deliverable. Alternatively or additionally, in some embodiments, the electronic deliverables management system 706 determines location(s) and/or time(s) that are most likely to access data associated with a particular electronic deliverable. In this regard, the electronic deliverables management system 706 initiates one or more process(es) to cause transmission of enhanced signal waves within the area(s) and/or at time(s) where and/or when the data associated with a particular electronic deliverable is likely to be accessed.

Example Interfaces of the Disclosure

Having described example systems, apparatuses, and data flows in accordance with the present disclosure, example interfaces in accordance with the present disclosure will now be discussed. Each user interface may be renderable via any of a myriad of display(s). For example, in some embodiments a user interface is renderable via a deliverables connected client device, for example embodied by the client device apparatus 300. In some embodiments, the client device apparatus 300 configures and/or otherwise causes rendering of the particular user interface(s) depicted. For example, in some embodiments, the client device apparatus 300 receives data from an enhanced delivering radio processor, for example embodied by the signal processing apparatus 200 for rendering via a display of the client device apparatus 300.

FIG. 8A illustrates an example deliverables display interface in accordance with at least some example embodiments of the present disclosure. Specifically, FIG. 8A illustrates an example deliverables display interface 800. The deliverables display interface 800 includes a plurality of interface elements associated with and/or embodying an electronic deliverable. As illustrated, the deliverables display interface 800 includes image elements 806A, 806B, 806C, and 806D (collectively "image elements 806"), deliverable content element 802, and web resource locator element 804. It should be appreciated that, in other embodiments, the deliverables display interface 800 may include any of a myriad of other, additional, and/or alternative interface elements. For example, in some embodiments, the deliverables display interface 800 may include text element(s), image element(s), video element(s), animating element(s), interface control element(s), and/or the like.

One or more interface elements of the deliverables display interface 800 is configurable based at least in part on received enhanced external display data. For example, in some embodiments, the enhanced external display data comprises visual data processable by the client device apparatus 300 for rendering all elements of the deliverables display interface 800. Alternatively or additionally, in some embodiments, the enhanced external display data comprises a web resource locator that is automatically accessed by the client device apparatus 300 to retrieve web resource data embodying the deliverables display interface 800 (e.g., a hosted webpage rendered via the client device apparatus 300).

Alternatively or additionally, in some embodiments, the enhanced external display data includes particular data utilized for configuring one or more particular interface elements of the deliverables display interface 800. In some embodiments, the client device apparatus 300 receives enhanced external display data including at least the web resource locator for displaying via the web resource locator element 804. In this regard, the client device apparatus 300 may be preconfigured to display the web resource locator element 804 comprising the provided web resource locator in a particular position within the deliverables display interface 800. Alternatively or additionally, in some embodiments, the enhanced external display data received by the client device apparatus 300 includes data identifying the position within the deliverables display interface 800 where the web resource locator element 804 is to be rendered. In some embodiments, the enhanced external display data includes various other data embodying and/or defining data used for rendering one or more of the image elements 806, and/or the deliverable content element 802. For example, in some embodiments, the enhanced external display data comprises at least the content (e.g., text content) corresponding to the deliverable content element 802, the image content to be displayed within one or more of the image elements 806, and/or the like.

In some embodiments, one or more interface elements of the deliverables display interface 800 is predetermined from by the client device apparatus 300 without configuration based at least in part on enhanced external display data. For example, in some embodiments, the client device apparatus 300 is configured to output the deliverables display interface 800 comprising a predetermined background image, predetermined image element(s), and/or the like. In one example context, the client device apparatus 300 is preconfigured to generate the deliverables display interface 800 comprising a background image including the image elements 806.

The deliverables display interface 800 may be configured to enable access of an associated electronic deliverables. In some embodiments, for example, the deliverables display interface 800 is configured to receive user input for accessing the deliverables display interface 800 and an electronic deliverable associated therewith. Alternatively or additionally, in some embodiments, the deliverables display interface 800 includes one or more particular interface element(s) configured to initiate such access. For example, in some embodiments, the web resource locator element 804 is configured to enable access of the deliverables display interface 800. In this regard, a user of the client device apparatus 300 may provide user input that interacts with the web resource locator element 804 to access the deliverables display interface 800. In some embodiments, the client device apparatus 300 generates access data and/or transmits such access data to an electronic deliverables management system in response to such access.

FIG. 8B illustrates another example deliverables display interface in accordance with at least some example embodiments of the present disclosure. Specifically, FIG. 8B illustrates an example deliverables display interface 850. The deliverables display interface 850 includes a plurality of interface elements, including image elements 856A, 856B, 856C, and 856D (collectively "image elements 856"), deliverable content element 852, and redeemable electronic code element 854. It should be appreciated that, in other embodiments, the deliverables display interface 850 may include any of a myriad of other, additional, and/or alternative interface elements. For example, in some embodiments, the deliverables display interface 850 may include text element(s), image element(s), video element(s), animating element(s), interface control element(s), and/or the like.

It should be appreciated that the image elements 856 may be configured similar to the similarly named elements as depicted and described with respect to FIG. 8A. For purposes of brevity, repeated disclosure with respect to these elements is omitted.

The data represented by the deliverable content element 852 and/or the redeemable electronic code element 854 may be embodied within other enhanced external display data received by the client device apparatus 300. For example, in some embodiments, the client device apparatus 300 is receives the enhanced external display data and determines whether the type of data included in the enhanced external display data. Alternatively or additionally, the client device apparatus 300 is configured to receive enhanced external display data including particular types of data for display (e.g., a redeemable electronic code and/or a web resource locator).

The deliverables display interface 850 includes deliverable content element 852. As depicted, the deliverable content element 852 indicates a promotion corresponding to a redeemable electronic deliverable. Specifically, the deliverable content element 852 indicates a promotion for receiving a particular value off of a transaction above a particular value (e.g., $10 off of $100). The deliverable content element 852 indicate such data associated with a particular electronic deliverable provided by a particular entity, for example the provider corresponding to main transmission content being output via an audio output associated with an enhanced delivering radio processor.

The redeemable electronic code element 854 represents a particular redeemable electronic code associated with the electronic deliverable. In some embodiments, the redeemable electronic code enables redemption of the associated electronic deliverable, for example via submission of the redeemable electronic code to a point of sales or other processing system associated with the provider of the electronic deliverable during processing of a transaction. It should be appreciated that the redeemable electronic code may be parsed and/or extracted from device display data received by the client device apparatus 300.

In some embodiments, the client device apparatus 300 is configured to detect access of the deliverables display interface 850. For example, in some embodiments, the client device apparatus 300 is configured to detect user input associated with the deliverables display interface 850, or particular interface elements thereof (e.g., with the redeemable electronic code element 854). The client device apparatus 300 may determine whether the user interacts with the redeemable electronic code represented by the redeemable electronic code element 854. Alternatively or additionally, in some embodiments, the client device apparatus 300 determines whether the user screenshots, saves, or otherwise interacts with the redeemable electronic code represented by the redeemable electronic code element 854 within the deliverables display interface 850.

In some embodiments, upon access of the deliverables display interface 850, the client device apparatus 300 transmits access data associated with the deliverables display interface 850 and/or associated electronic deliverable to an electronic deliverables management system. For example, in some embodiments, the client device apparatus 300 transmits access data including the redeemable electronic code, client device information, and/or other data identifying the electronic deliverable associated with the deliverables display interface 850. Additionally or alternatively, the access data includes an identifier for the electronic deliverable corresponding to the deliverables display interface 850. The client device apparatus 300 may generate and/or transmit the access data comprising datetime, location, and/or other information associated with access of the deliverables display interface 850.

Example Processes of the Disclosure

Having described example systems, apparatuses, computing environments, interfaces, and data visualizations of the disclosure, example processes in accordance with the present disclosure will now be described. It will be appreciated that each of the flowcharts depicts an example computer-implemented process that may be performed by one or more of the apparatuses, systems, devices, and/or computer program products described herein, for example utilizing one or more of the specially configured components thereof.

The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 9 illustrates a flowchart depicting example operations of an example process for processing and tracking of wirelessly transmitted signals in accordance with at least some example embodiments of the present disclosure. Specifically, FIG. 9 illustrates operations of an example process 900.

In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the signal processing apparatus 200 alone or in communication with one or more other component(s), device(s), system(s), and/or the like. In this regard, in some such embodiments, the signal processing apparatus 200 is specially configured by computer-coded instructions (e.g., computer program instructions) stored thereon, for example in the memory 204 and/or another component depicted and/or described herein and/or otherwise accessible to the signal processing apparatus 200, for performing the operations as depicted and described. In some embodiments, the signal processing apparatus 200 is in communication with one or more external apparatus(es), system(s), device(s), and/or the like, to perform one or more of the operations as depicted and described. For example, the signal processing apparatus 200 may be in communication with a deliverables connected client device (e.g., embodied by the client device apparatus 300) and/or an external data system (e.g., an electronic deliverables management system embodied by the electronic deliverables management apparatus 500). For purposes of simplifying the description, the process 900 is described as performed by and from the perspective of the signal processing apparatus 200, for example embodying a particular enhanced delivering radio processor.

The example process 900 is described particularly with respect to processing radio signals. It should be appreciated that, in other embodiments, such processes may be performed similarly with respect to other wireless transmitted signals. Accordingly, the particular types of signals depicted and described with respect to each of the processes described herein should not limit the scope nor spirit of the disclosure.

The process 900 begins at operation 902. At operation 902, the signal processing apparatus 200 includes means, such as the signal processing circuitry 212, signal receiver circuitry 210, the communications circuitry 208, the input/output circuitry 206, the processor 202, and/or the like, or a combination thereof, to receive, via a radio receiver, an enhanced radio transmission signal. In some embodiments, the enhanced radio transmission signal comprises at least radio transmission content and enhanced external display data. The enhanced radio transmission signal may comprise a digital signal generated based at least in part on enhanced radio signal waves captured and/or otherwise detected via the radio receiver. For example, the enhanced radio signal wave(s) may embody radio transmission(s) from an enhanced delivery radio transmitter associated with a radio station, such radio transmission(s) including radio transmission content to be outputted via output devices associated with or embodied within the signal processing apparatus 200, and enhanced external display data to be outputted via a deliverables connected client device. It should be appreciated that the enhanced radio transmission signal may include any number of additional and/or alternative data portions, for example additional primary content associated with the radio transmission content for visual and/or audio outputting via the signal processing apparatus 200. In this regard, it should be appreciated that the radio transmission content and the enhanced external display data may be associated with one another.

At operation 904, the signal processing apparatus 200 includes means, such as the signal processing circuitry 212, signal receiver circuitry 210, the communications circuitry 208, the input/output circuitry 206, the processor 202, and/or the like, or a combination thereof, to extract the enhanced external display data from the enhanced radio transmission signal. In some embodiments, the enhanced radio transmission signal includes one or more identifier(s) that the signal processing apparatus 200 utilizes to identify and extract the enhanced external display data from the enhanced radio transmission signal. In some embodiments, the enhanced radio transmission signal includes key-pair values including a key that uniquely identifies the enhanced external display data and a corresponding data value embodying the enhanced external display data itself. Alternatively or additionally, in some embodiments, the enhanced radio transmission signal comprises the radio transmission content and enhanced external display data in particular predefined portions (e.g., a particular number of bytes corresponding to radio transmission content, then a particular number of bytes corresponding to enhanced external display data) such that the signal processing apparatus 200 is specially configured to identify and extract the enhanced external display data based on the position of such data within the enhanced radio transmission signal.

At operation 906, the signal processing apparatus 200 includes means, such as the signal processing circuitry 212, signal receiver circuitry 210, the communications circuitry 208, the input/output circuitry 206, the processor 202, and/or the like, or a combination thereof, to forward the enhanced external display data to a deliverables connected client device. The deliverables connected client device may be communicable with the signal processing apparatus 200 over one or more connection(s). The connection(s) formed between the signal processing apparatus 200 and the deliverables connected client device may function over a shorter range than the communication capabilities utilized to receive enhanced radio signal waves corresponding to the enhanced radio transmission signal, for example from an enhanced delivery radio transmitter. For example, in some embodiments the signal processing apparatus 200 forwards the enhanced external display data to the deliverables connected client device via a wired connection established with the deliverables connected client device (e.g., a wired USB connection). Alternatively or additionally, in some embodiments, the signal processing apparatus 200 forwards the enhanced external display data to the deliverables connected client device via a short-range wireless connection established with the deliverables connected client device (e.g., via Bluetooth, NFC, and/or the like). It should be appreciated that to forward the enhanced external display data, the signal processing apparatus 200 may transmit any number of data transmissions to the deliverables connected client device comprising portions or all of the enhanced external display data.

At operation 908, the signal processing apparatus 200 includes means, such as the signal processing circuitry 212, signal receiver circuitry 210, the communications circuitry 208, the input/output circuitry 206, the processor 202, and/or the like, or a combination thereof, to cause rendering, via the deliverables connected client device, of a deliverables display interface. For example, in some embodiments the forwarding of the enhanced external display data to the deliverables connected client device causes the deliverables connected client device to render the deliverables display interface accordingly. The deliverables display interface is rendered based at least in part on the enhanced external display data. For example, in some embodiments, the deliverables connected client device utilizes the enhanced external display data to configure one or more interface elements of the deliverables display interface. In some embodiments, the enhanced external display data includes one or more portion(s) of data associated with or identifying a particular electronic deliverable that are rendered via corresponding interface element(s) within the deliverables display interface. For example, in some embodiments the enhanced external display data includes a redeemable deliverable code that is rendered within the deliverables display interface for access by the deliverables connected client device and/or a user thereof. Alternatively or additionally, in some embodiments the enhanced external display data includes a web resource locator that is rendered within the deliverables display interface for access by the deliverables connected client device and/or a user thereof. In some embodiments, the enhanced external display data is utilized to configure one or more background or content elements of the deliverables display interface, for example image, video, animation, and/or other visual elements, hidden elements, or audio elements of the deliverables display interface.

FIG. 10 illustrates a flowchart depicting example operations of an example process for validating a location data object associated with a deliverables connected client device in accordance with at least some example embodiments of the present disclosure. Specifically, FIG. 10 depicts operations of an example process 1000. In some embodiments, the process 1000 is embodied by computer program code stored on a non-transitory computer-readable storage medium of a computer program product configured for execution to perform the process as depicted and described. Alternatively or additionally, in some embodiments, the process 1000 is performed by one or more specially configured computing devices, such as the signal processing apparatus 200, the client device apparatus 300, and/or the electronic deliverables management apparatus 500. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus(es), system(s), device(s), and/or the like, to perform one or more of the operations as depicted and described. For purposes of simplifying the description, the process 1000 is described as performed by and from the perspective of the client device apparatus 300. Alternatively or additionally, in some other embodiments, the process 1000 is performed in whole or in part by a signal processing apparatus 200, and/or an electronic deliverables management apparatus 500.

The process 1000 begins at operation 1002. In some embodiments, the process 1000 begins after one or more operations depicted and/or described with respect to any of the other processes described herein. For example, in some embodiments as depicted, the process 1000 begins after execution of operation 904. In this regard, some or all of the process 1000 may replace or supplement one or more blocks depicted and/or described with respect to any of the other processes described herein. Upon completion of the process 1000, the flow of operations may terminate. Additionally or alternatively, as depicted, upon completion of the process 1000, flow may return to one or more operations of another process, for example to the operation 906 as depicted. It should be appreciated that, in some embodiments, the process 1000 embodies a subprocess of one or more other process(es), such as the process 900.

At operation 1002, the client device apparatus 300 includes means, such as the external data processing circuitry 312, data receiver circuitry 310, the communications circuitry 308, the input/output circuitry 306, the processor 302, and/or the like, or a combination thereof, to receive a location data object associated with the deliverables connected client device. In some embodiments, the location data object is received in response to access of the deliverables display interface associated with the enhanced external display data via the deliverables connected client device. For example, the location data is determined corresponding to the current location of the deliverables connected client device at the time of access (e.g., utilizing GPS, triangulation, cell tower pinging, and/or the like). In some embodiments, such location data may subsequently be forwarded by the client device apparatus 300 for processing by another system (e.g., an associated signal processing apparatus 200 and/or electronic deliverables management apparatus 500).

At operation 1004, the client device apparatus 300 includes means, such as the external data processing circuitry 312, data receiver circuitry 310, the communications circuitry 308, the input/output circuitry 306, the processor 302, and/or the like, or a combination thereof, to validate the location data object associated with the deliverables connected client device. In some embodiments, the client device apparatus 300 validates the location data object based at least in part on a target location geofence associated with the enhanced external display data. The target location geofence may be predefined, received as part of the enhanced external display data, and/or requested and retrieved from an electronic deliverables management apparatus 500. In some embodiments, the client device apparatus 300 (or another communicable device, such as the signal processing apparatus 200 and/or the electronic deliverables management apparatus 500) initiates a determination of whether the location data object associated with the deliverables connected client device indicates a location within the target location geofence. In some such embodiments, the location data object associated with the deliverables connected client device is determined validated in a circumstance where the location data object indicates a location within the target location geofence. Additionally or alternatively, in some embodiments, the location data object associated with the deliverables connected client device is determined not validated in a circumstance where the location data object indicates a location that falls outside of the target location geofence. In some embodiments, the client device apparatus 300 transmits the location data object to the electronic deliverables management apparatus 500 to cause the electronic deliverables management apparatus 500 to perform the described validation process. In some such embodiments, the client device apparatus 300 receives a validation indicator indicating whether the location data object was validated or not validated, and may proceed based on the value represented by the validation indicator.

In some embodiments, in circumstances where the location data object is validated, the client device apparatus 300 proceeds with processing received enhanced external display data. For example, in some embodiments, the client device apparatus 300 renders a deliverables display interface based at least in part on received enhanced external display data in a circumstance where the location data object is validated. Alternatively or additionally, in some embodiments, the client device apparatus 300 terminates processing of the enhanced external display data and/or discards the enhanced external display data in a circumstance where the location data object is not validated. In some embodiments, the client device apparatus 300 causes rendering of an error message indicating the location data object is not within a target location geofence in a circumstance where the location data object is not validated.

In yet some other embodiments, the client device apparatus 300 generates and/or forwards a validation indicator indicating whether the location data object was validated to the signal processing apparatus 200. In some such embodiments, the client device 300 receives the external display device for processing from the signal processing apparatus 200 in response to forwarding the validation indicator indicating the location data object was validated. In circumstances where a validation indicator is forwarded indicating the location data object was not validated, no enhanced external display data may be received from the signal processing apparatus 200.

FIG. 11 illustrates a flowchart depicting example operations of an example process for storing access data associated with enhanced external display data in accordance with at least some example embodiments of the present disclosure. Specifically, FIG. 11 depicts operations of an example process 1100. In some embodiments, the process 1100 is embodied by computer program code stored on a non-transitory computer-readable storage medium of a computer program product configured for execution to perform the process as depicted and described. Alternatively or additionally, in some embodiments, the process 1100 is performed by one or more specially configured computing devices, such as the signal processing apparatus 200, the client device apparatus 300, and/or the electronic deliverables management apparatus 500. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus(es), system(s), device(s), and/or the like, to perform one or more of the operations as depicted and described. For purposes of simplifying the description, the process 1100 is described as performed by and from the perspective of the electronic deliverables management apparatus 500. Alternatively or additionally, in some other embodiments, the process 1100 is performed in whole or in part by a signal processing apparatus 200, and/or a client device apparatus 300.

The process 1100 begins at operation 1102. In some embodiments, the process 1100 begins after one or more operations depicted and/or described with respect to any of the other processes described herein. For example, in some embodiments as depicted, the process 1100 begins after execution of operation 908. In this regard, some or all of the process 1100 may replace or supplement one or more blocks depicted and/or described with respect to any of the other processes described herein. Upon completion of the process 1100, the flow of operations may terminate. Additionally or alternatively, as depicted, upon completion of the process 1100, flow may return to one or more operations of another process. It should be appreciated that, in some embodiments, the process 1100 embodies a subprocess of one or more other process(es), such as the process 900.

At operation 1102, the electronic deliverables management apparatus 500 includes means, such as the access tracking circuitry 512, electronic deliverable storage circuitry 510, the communications circuitry 508, the input/output circuitry 506, the processor 502, and/or the like, or a combination thereof, to receive access data indicative of access of the deliverables display interface associated with enhanced external display data. The access data may indicate access of the deliverables display interface by the deliverables connected client device and/or a user associated therewith. In some embodiments, the access data is received via a deliverables connected client device, for example embodied by a client device apparatus 300, that received enhanced external display data forwarded from a signal processing apparatus 200 as described herein. The access data may be generated in response to user input and/or interaction with the deliverables display interface. In some embodiments, the access data may be generated in response to user interaction with particular interface elements of the deliverables display interface (e.g., a web resource locator associated with the electronic deliverable).

At operation 1104, the electronic deliverables management apparatus 500 includes means, such as the access tracking circuitry 512, electronic deliverable storage circuitry 510, the communications circuitry 508, the input/output circuitry 506, the processor 502, and/or the like, or a combination thereof, to store at least a portion of the access data. In some embodiments, the access data is stored associated with the enhanced external display data. In this regard, the portion(s) of access data may be stored with the electronic deliverable corresponding to the enhanced external display data, such that the access data may be subsequently retrieved and/or processed. For example, various portions of access data corresponding with various users and associated with the enhanced external display data corresponding to a particular electronic deliverable may be utilized in determining relevant characteristics of users, client devices, locations, and/or the like where access occurs.

FIG. 12 illustrates a flowchart depicting example operations of an example process for storing access data associated with enhanced external display data in accordance with at least some example embodiments of the present disclosure. Specifically, FIG. 12 depicts operations of an example process 1200. In some embodiments, the process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the signal processing apparatus 200, the client device apparatus 300, and/or the electronic deliverables management apparatus 500. Such computing devices may perform the operations of the described processes alone or in communication with one or more other component(s), device(s), system(s), and/or the like. In this regard, in some such embodiments, the computing device(s) is/are specially configured by computer-coded instructions (e.g., computer program instructions) stored thereon, for example in a memory and/or another component depicted and/or described herein and/or otherwise accessible to the computing device(s), for performing the operations as depicted and described. In some embodiments, the computing device(s) is/are in communication with one or more external apparatus(es), system(s), device(s), and/or the like, to perform one or more of the operations as depicted and described. For purposes of simplifying the description, the process 1200 is described as performed by and from the perspective of the signal processing apparatus 200. Alternatively or additionally, in some other embodiments, the process 1200 is performed in whole or in part by a client device apparatus 300.

The process 1200 begins at operation 1202. In some embodiments, the process 1200 begins after one or more operations depicted and/or described with respect to any of the other processes described herein. For example, in some embodiments as depicted, the process 1200 begins after execution of operation 902. In this regard, some or all of the process 1200 may replace or supplement one or more blocks depicted and/or described with respect to any of the other processes described herein. Upon completion of the process 1200, the flow of operations may terminate. Additionally or alternatively, as depicted, upon completion of the process 1200, flow may return to one or more operations of another process. It should be appreciated that, in some embodiments, the process 1200 embodies a subprocess of one or more other process(es), such as the process 900.

At operation 1202, the signal processing apparatus 200 includes means, such as the signal processing circuitry 212, signal receiver circuitry 210, the communications circuitry 208, the input/output circuitry 206, the processor 202, and/or the like, or a combination thereof, to receive a connection approval indicator. The connection approval indicator may indicate user approval of communication connection between the signal processing apparatus 200 and a deliverables connected client device, for example embodied by a client device apparatus 300. In some embodiments, the connection approval indicator is received via the client device apparatus 300, for example in response to user input indicating such approval. In some embodiments, the client device apparatus 300 renders a prompt requesting user approval of such a connection upon detecting a wired connection between the signal processing apparatus 200 and the deliverables connected client device, or upon initiation of a wireless connection between the signal processing apparatus 200 and the deliverables connected client device.

At operation 1204, the signal processing apparatus 200 includes means, such as the signal processing circuitry 212, signal receiver circuitry 210, the communications circuitry 208, the input/output circuitry 206, the processor 202, and/or the like, or a combination thereof, to enable communication with the deliverables connected client device. In some embodiments, the signal processing apparatus 200 enables communication with the deliverables connected client device in response to receiving the connection approval indicator. In some embodiments, the signal processing apparatus 200 and the deliverables connected client device establish a connection by transferring one or more data packets that enables trusted and/or authenticatable subsequent data transfers between such devices. Alternatively or additionally, in some embodiments, the deliverables connected client device may accept data transmissions from the signal processing apparatus 200 upon receiving the connection approval indicator.

At optional operation 1206, the signal processing apparatus 200 includes means, such as the signal processing circuitry 212, signal receiver circuitry 210, the communications circuitry 208, the input/output circuitry 206, the processor 202, and/or the like, or a combination thereof, to store the connection approval indicator and/or data associated with the deliverables connected client device. In some embodiments, for example, the signal processing apparatus 200 stores a set of connection approval indicators and identifies a particular connection approval indicator corresponding to a deliverables connected client device from the set of connection approval indicators before forwarding enhanced external display data to the deliverables connected client device. Alternatively or additionally, in some embodiments, the signal processing apparatus 200 stores data identifying the deliverables connected client device indicating that the deliverables connected client device has approved connection with the signal processing apparatus 200. Alternatively or additionally still, in some embodiments the signal processing apparatus 200 stores data associated with the deliverables connected client device that is used to transmit trusted data transmissions to the deliverables connected client device (e.g., a unique key associated with the deliverables connected client device for use in encrypting enhanced external display data transmissions, and/or the like). Additionally or alternatively, in some embodiments, the deliverables connected client device stores the connection approval indicator and/or other data associated with the signal processing apparatus 200 for use in subsequently determining communications with the signal processing apparatus 200 have previously been approved.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

identifying, using a radio transmission system, first data representing data for transmission associated with an electronic deliverable;

identifying, using the radio transmission system additional data corresponding to the electronic deliverable, wherein the additional data represents output data processable by a deliverables connected client device associated with an enhanced delivering signal processor, wherein the radio transmission system is located remotely from the deliverables connected client device and the enhanced delivering signal processor; and causing generation, via a transmitter associated with the radio transmission system, of enhanced signal waves comprising a first portion representing the first data and a second portion representing the additional data, wherein the enhanced signal waves are processable by the enhanced delivering signal processor to extract the second portion from the enhanced signal waves.

2. The computer-implemented method according to claim 1, wherein the additional data is identified in response to user input received via a user interface.

3. The computer-implemented method according to claim 1, wherein causing generation of the enhanced signal waves comprises:

activating the transmitter to cause the transmitter to generate the enhanced signal waves in accordance with a particular communications protocol.

4. The computer-implemented method according to claim 1, wherein the enhanced signal waves comprise radio signal waves specially configured to embody the first data and the additional data.

5. The computer-implemented method according to claim 1, wherein the enhanced signal waves cause the enhanced delivering signal processor to forward the output data to the deliverables connected client device.

6. The computer-implemented method according to claim 1, further comprising:

receiving, via a second communications network, access data associated with the deliverables connected client device in response to generation of the enhanced signal waves; and storing the access data associated with the electronic deliverable.

7. The computer-implemented method according to claim 6, further comprising:

determining, based at least in part on the access data and other access data associated with at least one other deliverables connected client device, digital reach data corresponding to the electronic deliverable; and outputting the digital reach data.

8. An apparatus comprising at least one processor and at least one memory having computer-coded instructions stored thereon that, in execution with the at least one processor, causes the apparatus to:

identify, using a radio transmission system, first data representing data for transmission associated with an electronic deliverable;

identify, using the radio transmission system, additional data corresponding to the electronic deliverable, wherein the additional data represents output data processable by a deliverables connected client device associated with an enhanced delivering signal processor wherein the radio transmission system is located remotely from the deliverables connected client device and the enhanced delivering signal processor; and cause generation, via a transmitter associated with the radio transmission system, of enhanced signal waves comprising a first portion representing the first data and a second portion representing the additional data, wherein the enhanced signal waves are processable by the enhanced delivering signal processor to extract the second portion from the enhanced signal waves.

9. The apparatus according to claim 8, wherein the additional data is identified in response to user input received via a user interface.

10. The apparatus according to claim 8, wherein to cause generation of the enhanced signal waves the apparatus is caused to:

activate the transmitter to cause the transmitter to generate the enhanced signal waves in accordance with a particular communications protocol.

11. The apparatus according to claim 8, wherein the enhanced signal waves comprise radio signal waves specially configured to embody the first data and the additional data.

12. The apparatus according to claim 8, wherein the enhanced signal waves cause the enhanced delivering signal processor to forward the output data to the deliverables connected client device.

13. The apparatus according to claim 8, further caused to:

receive, via a second communications network, access data associated with the deliverables connected client device in response to generation of the enhanced signal waves; and store the access data associated with the electronic deliverable.

14. The apparatus according to claim 13, further caused to:

determine, based at least in part on the access data and other access data associated with at least one other deliverables connected client device, digital reach data corresponding to the electronic deliverable; and output the digital reach data.

15. A computer program product comprising at least one non-transitory computer-readable storage medium having computer program code stored thereon that, in execution with at least one processor causes the computer program product to:

identify, using a radio transmission system, first data representing data for transmission associated with an electronic deliverable;

identify, using the radio transmission system, additional data corresponding to the electronic deliverable, wherein the additional data represents output data processable by a deliverables connected client device associated with an enhanced delivering signal processor wherein the radio transmission system is located remotely from the deliverables connected client device and the enhanced delivering signal processor; and cause generation, via a transmitter associated with the radio transmission system, of enhanced signal waves comprising a first portion representing the first data and a second portion representing the additional data, wherein the enhanced signal waves are processable by the enhanced delivering signal processor to extract the second portion from the enhanced signal waves.

16. The computer program product according to claim 15, wherein the additional data is identified in response to user input received via a user interface.

17. The computer program product according to claim 15, wherein to cause generation of the enhanced signal waves the computer program product is configured to:

activate the transmitter to cause the transmitter to generate the enhanced signal waves in accordance with a particular communications protocol.

18. The computer program product according to claim 15, wherein the enhanced signal waves comprise radio signal waves specially configured to embody the first data and the additional data.

19. The computer program product according to claim 15, wherein the enhanced signal waves cause the enhanced delivering signal processor to forward the output data to the deliverables connected client device.

20. The computer program product according to claim 15, further configured to:

receive, via a second communications network, access data associated with the deliverables connected client device in response to generation of the enhanced signal waves;

store the access data associated with the electronic deliverable;

determine, based at least in part on the access data and other access data associated with at least one other deliverables connected client device, digital reach data corresponding to the electronic deliverable; and output the digital reach data.

* * * * *

50